(12) United States Patent
Wang

(10) Patent No.: US 11,886,595 B2
(45) Date of Patent: Jan. 30, 2024

(54) COMPUTER BOOT METHOD, CONTROLLER, STORAGE MEDIUM, AND SYSTEM

(71) Applicant: XFUSION DIGITAL TECHNOLOGIES CO., LTD., Zhengzhou (CN)

(72) Inventor: Shichao Wang, Shenzhen (CN)

(73) Assignee: XFUSION DIGITAL TECHNOLOGIES CO., LTD., Zhengzhou (CN)

( * ) Notice: Subject to any disclaimer, the term of this patent is extended or adjusted under 35 U.S.C. 154(b) by 100 days.

(21) Appl. No.: 17/564,683

(22) Filed: Dec. 29, 2021

(65) Prior Publication Data
US 2022/0121751 A1 Apr. 21, 2022

Related U.S. Application Data

(63) Continuation of application No. PCT/CN2020/113345, filed on Sep. 3, 2020.

(30) Foreign Application Priority Data

Sep. 19, 2019 (CN) .......................... 201910887279.2

(51) Int. Cl.
*G06F 21/57* (2013.01)
*G06F 9/4401* (2018.01)
(Continued)

(52) U.S. Cl.
CPC .......... *G06F 21/575* (2013.01); *G06F 9/4406* (2013.01); *G06F 2221/034* (2013.01)

(58) Field of Classification Search
CPC ................. G06F 21/575; G06F 9/4406; G06F 2221/034; G06F 21/572; G06F 21/85
(Continued)

(56) References Cited

U.S. PATENT DOCUMENTS 6,711,675 B1 3/2004 Spiegel et al.
9,542,195 B1 1/2017 Astarabadi et al.
(Continued)

FOREIGN PATENT DOCUMENTS

CN 103186434 A 7/2013
CN 105160255 A 12/2015
(Continued)

OTHER PUBLICATIONS

Su Zhenyu et al.,"Research and Implementation of Secure Boot Technology for Server Based on Domestic BMC", Journal of Information Security Research ,Aug. 1, 2017, with an English abstract,total 9 pages.

*Primary Examiner* — Michael J Brown
(74) *Attorney, Agent, or Firm* — WOMBLE BOND DICKINSON (US) LLP

(57) ABSTRACT

Embodiments of this application describe a computer boot method, a controller, a storage medium, and a system, to improve a boot security level of a computer, and avoid a security risk caused by using a tampered boot program file. In a method, a controller is separately connected to a computer hardware system and a BIOS file storage apparatus. The controller obtains a first boot program file in the BIOS file storage apparatus when the controller is powered on and run. The controller establishes a connection between the BIOS file storage apparatus and the computer hardware system when the first boot program file is successfully checked, so that when the connection between the BIOS file storage apparatus and the computer hardware system is successfully established, the computer hardware system completes power-on and running by using the first boot program file.

20 Claims, 12 Drawing Sheets

(51) Int. Cl.
*G06F 9/44* (2018.01)
*G06F 21/85* (2013.01)

(58) Field of Classification Search
USPC .................................................. 713/1, 2, 100
See application file for complete search history.

(56) References Cited

U.S. PATENT DOCUMENTS

| | | | |
|---|---|---|---|
| 2004/0153846 A1* | 8/2004 | Lee | G06F 11/1417 714/E11.133 |
| 2009/0217024 A1* | 8/2009 | Childs | G06F 11/1417 707/999.204 |
| 2012/0079260 A1* | 3/2012 | Yin | G06F 11/1417 713/2 |
| 2016/0328300 A1 | 11/2016 | Rahardjo et al. | |
| 2019/0156039 A1* | 5/2019 | Harsany | G06F 21/568 |
| 2019/0251266 A1 | 8/2019 | Tuttle et al. | |
| 2020/0250313 A1* | 8/2020 | Li | G06F 11/1004 |

FOREIGN PATENT DOCUMENTS

| | | |
|---|---|---|
| CN | 106484578 A | 3/2017 |
| CN | 109670319 A | 4/2019 |
| CN | 109992316 A | 7/2019 |
| CN | 110175478 A | 8/2019 |
| CN | 110197070 A | 9/2019 |
| CN | 110795738 A | 2/2020 |
| WO | 2014175867 A1 | 10/2014 |

\* cited by examiner

COMPUTER BOOT METHOD, CONTROLLER, STORAGE MEDIUM, AND SYSTEM

CROSS-REFERENCE TO RELATED APPLICATIONS

This application is a continuation of International Application No. PCT/CN2020/113345, filed on Sep. 3, 2020, which claims priority to Chinese Patent Application No. 201910887279.2, filed on Sep. 19, 2019. The disclosures of the aforementioned applications are hereby incorporated by reference in their entireties.

TECHNICAL FIELD

This application relates to the field of computer technologies, and in particular, to a computer boot method, a controller, a storage medium, and a system.

BACKGROUND

A current computer has a plurality of implementation architectures. For example, the computer may use an x86 system. In a boot process, the x86 system needs to rely on a basic input/output system (BIOS) hardware system, the BIOS hardware system may include a flash, and the flash stores a BIOS program file.

After the current BIOS hardware system is powered on, the BIOS program file stored in the flash in the BIOS hardware system is loaded, to set basic information of the x86 system. In this case, boot configuration is completed, so that the x86 system is powered on, to ensure that the x86 system can be normally powered on and run. After the x86 system is powered on and runs, system command authority is transferred to an operating system (OS) of a computer, and the OS controls the computer.

If there is no BIOS hardware system, the computer cannot be booted. When the BIOS program file stored in the flash in the BIOS hardware system is tampered with or damaged, settings of a user for the BIOS hardware system may be lost, or security permission set by the user may be tampered with. Consequently, the x86 system cannot be booted or is attacked and controlled by a hacker, resulting in a security incident of information leakage.

Therefore, when the BIOS program file is tampered with, a current computer boot method has a problem that the computer is booted based on the tampered BIOS program file, resulting in a security risk.

SUMMARY

Embodiments of this application provide a computer boot method, a controller, a storage medium, and a system, to improve a boot security level of a computer, and avoid a security risk caused by using a tampered boot program file.

To resolve the foregoing problem, the embodiments of this application provide the following technical solutions.

According to a first aspect, an embodiment of this application provides a computer boot method. The method is applied to a controller, and the controller is separately connected to a computer hardware system and a basic input/output system BIOS file storage apparatus. The method includes: The controller obtains a first boot program file in the BIOS file storage apparatus when the controller is powered on and runs, where the first boot program file is a BIOS file pre-stored in the BIOS file storage apparatus. The controller checks the first boot program file. The controller establishes a connection between the BIOS file storage apparatus and the computer hardware system when the first boot program file is successfully checked, so that when the connection between the BIOS file storage apparatus and the computer hardware system is successfully established, the computer hardware system completes power-on and running by using the first boot program file.

In this embodiment of this application, the controller is separately connected to the computer hardware system and the BIOS file storage apparatus. The controller first obtains the first boot program file in the BIOS file storage apparatus when the controller is powered on and runs, where the first boot program file is the BIOS file pre-stored in the BIOS file storage apparatus. Then, the controller checks the first boot program file. The controller establishes the connection between the BIOS file storage apparatus and the computer hardware system when the first boot program file is successfully checked, so that when the connection between the BIOS file storage apparatus and the computer hardware system is successfully established, the computer hardware system finally completes power-on and running by using the first boot program file. In this embodiment of this application, the controller may check the first boot program file in the BIOS file storage apparatus, and the controller establishes the connection between the BIOS file storage apparatus and the computer hardware system only when the first boot program file is successfully checked. In this case, the computer hardware system can read the first boot program file in the BIOS file storage apparatus to complete power-on and running. In this embodiment of this application, the controller may check the first boot program file pre-stored in the BIOS file storage apparatus, to ensure that the first boot program file is secure, that is, to ensure that the first boot program file is not tampered with, so as to improve a boot security level of the computer hardware system, and avoid a security risk caused by using a tampered boot program file.

In a possible embodiment, the checking, by the controller, the first boot program file includes: The controller performs check calculation by using a key and a boot program source file in the controller, to obtain a first check result, where the boot program source file is a BIOS file pre-stored in the controller. The controller performs check calculation by using the key and the first boot program file, to obtain a second check result. The controller determines, based on the first check result and the second check result, whether the first boot program file is successfully checked. In this solution, the controller first obtains the key and the boot program source file, and then performs check calculation by using the key and the boot program source file in the controller, to obtain the first check result. Similarly, the controller may further perform check calculation by using the key and the first boot program file, to obtain the second check result. Finally, the controller compares the two check results, and may determine, based on the first check result and the second check result, whether the first boot program file is successfully checked. For example, if the first check result is the same as the second check result, the controller determines that the boot program source file stored in the controller is the same as the first boot program file stored in the BIOS file storage apparatus, that is, the first boot program file stored in the BIOS file storage apparatus is not tampered with. In this case, an output check result is that the first boot program file is successfully checked. For another example, if the first check result is different from the second check result, the controller determines that the boot program source file stored in the controller is different from the first boot program file stored in the BIOS file storage apparatus, that is, the first boot program file stored in the BIOS file storage apparatus may be tampered with or damaged. In this case, an output check result is that the first boot program file fails to be checked.

In a possible embodiment, the method further includes: The controller writes a boot program source file to the BIOS file storage apparatus when the first boot program file fails to be checked, where the boot program source file is a BIOS file pre-stored in the controller. The controller checks the boot program source file written to the BIOS file storage apparatus. The controller establishes a connection between the BIOS file storage apparatus and the computer hardware system when the boot program source file written to the BIOS file storage apparatus is successfully checked, so that when the connection between the BIOS file storage apparatus and the computer hardware system is successfully established, the computer hardware system completes power-on and running by using the boot program source file written to the BIOS file storage apparatus. In this solution, when the first boot program file fails to be checked, it indicates that the first boot program file stored in the BIOS file storage apparatus may be tampered with or damaged, that is, the first boot program file stored in the BIOS file storage apparatus is untrustworthy. The controller may pre-store the boot program source file, where the boot program source file is an original file used to boot the computer hardware system, and the boot program source file may be pre-stored in the controller after being encrypted. For example, the controller may include a flash, and the flash may also be referred to as a flash memory controller. The flash may be configured to store the boot program source file, so that the controller performs check by using the boot program source file. The boot program source file may be further used to recover the tampered first boot program file in the BIOS file storage apparatus, so that an untampered boot program source file is re-written to the BIOS file storage apparatus. In this way, the computer hardware system can read the boot program source file re-written to the BIOS file storage apparatus to perform power-on and running by using the boot program source file, so as to avoid a security risk caused by using the tampered boot program file.

In a possible embodiment, the method further includes: The controller deletes the first boot program file stored in the BIOS file storage apparatus. When the first boot program file fails to be checked, it indicates that the first boot program file stored in the BIOS file storage apparatus may be tampered with or damaged, that is, the first boot program file stored in the BIOS file storage apparatus is untrustworthy. The controller may further delete the first boot program file stored in the BIOS file storage apparatus, that is, the controller may erase the tampered first boot program file in the BIOS file storage apparatus, so that the flash in the controller may be configured to re-write an untampered boot program source file, to improve space usage efficiency of the flash.

In a possible embodiment, the BIOS file storage apparatus includes a primary BIOS file storage module and a secondary BIOS file storage module, the controller is separately connected to the primary BIOS file storage module and the secondary BIOS file storage module, and both the primary BIOS file storage module and the secondary BIOS file storage module pre-store the first boot program file. That the controller obtains a first boot program file in the BIOS file storage apparatus includes: The controller obtains the first boot program file in the primary BIOS file storage module. That the controller checks the first boot program file includes: The controller checks the first boot program file in the primary BIOS file storage module. That the controller establishes a connection between the BIOS file storage apparatus and the computer hardware system when the first boot program file is successfully checked includes: The controller establishes a connection between the primary BIOS file storage module and the computer hardware system when the first boot program file in the primary BIOS file storage module is successfully checked. In this embodiment of this application, when the first boot program file is successfully checked, it indicates that the first boot program file stored in the primary BIOS file storage module is not tampered with, that is, the first boot program file stored in the primary BIOS file storage module is secure and trustworthy. In this case, the controller establishes the connection between the primary BIOS file storage module and the computer hardware system, for example, the controller connects the primary BIOS file storage module to the computer hardware system through a channel, so that the computer hardware system completes power-on and running by using the first boot program file. In this embodiment of this application, when the first boot program file stored in the primary BIOS file storage module is secure and trustworthy, the computer hardware system can read the first boot program file stored in the primary BIOS file storage module, and the computer hardware system can perform power-on and running by using the first boot program file only when reading the first boot program file, to improve a boot security level of the computer hardware system, and avoid a security risk caused by using a tampered boot program file.

In a possible embodiment, the method further includes: The controller obtains the first boot program file in the secondary BIOS file storage module when the first boot program file in the primary BIOS file storage module fails to be checked. The controller checks the first boot program file in the secondary BIOS file storage module. The controller establishes a connection between the secondary BIOS file storage module and the computer hardware system when the first boot program file in the secondary BIOS file storage module is successfully checked. In this embodiment of this application, when the first boot program file is successfully checked, it indicates that the first boot program file stored in the secondary BIOS file storage module is not tampered with, that is, the first boot program file stored in the secondary BIOS file storage module is secure and trustworthy. In this case, the controller establishes the connection between the secondary BIOS file storage module and the computer hardware system, for example, the controller connects the secondary BIOS file storage module to the computer hardware system through a channel, so that the computer hardware system completes power-on and running by using the first boot program file. In this embodiment of this application, only when the first boot program file stored in the secondary BIOS file storage module is secure and trustworthy, the computer hardware system can read the first boot program file stored in the secondary BIOS file storage module, and the computer hardware system can perform power-on and running by using the first boot program file only when reading the first boot program file, to improve a boot security level of the computer hardware system, and avoid a security risk caused by using a tampered boot program file.

In a possible embodiment, the method further includes: The controller writes a boot program source file to the primary BIOS file storage module when the first boot program file in the secondary BIOS file storage module fails to be checked, where the boot program source file is a BIOS file pre-stored in the controller. The controller checks the boot program source file written to the primary BIOS file storage module. The controller establishes a connection between the primary BIOS file storage module and the computer hardware system when the boot program source file written to the primary BIOS file storage module is successfully checked, so that when the connection between the primary BIOS file storage module and the computer hardware system is successfully established, the computer hardware system completes power-on and running by using the boot program source file written to the primary BIOS file storage module. In this solution, the controller may pre-store the boot program source file, where the boot program source file is an original file used to boot the computer hardware system, and the boot program source file may be pre-stored in the controller after being encrypted. For example, the controller may include a flash, and the flash may also be referred to as a flash memory controller. The flash may be configured to store the boot program source file, so that the controller performs check by using the boot program source file. The boot program source file may be further used to recover the tampered first boot program file in the primary BIOS file storage module, so that an untampered boot program source file is re-written to the primary BIOS file storage module. In this way, the computer hardware system can read the untampered boot program source file in the primary BIOS file storage module to complete power-on and running, so as to avoid a security risk caused by using the tampered boot program file.

In a possible embodiment, the method further includes: The controller writes a boot program source file to the secondary BIOS file storage module when the first boot program file in the secondary BIOS file storage module fails to be checked, where the boot program source file is a BIOS file pre-stored in the controller. When the first boot program file fails to be checked, it indicates that the first boot program file stored in the secondary BIOS file storage module may be tampered with or damaged, that is, the first boot program file stored in the secondary BIOS file storage module is untrustworthy. The controller may pre-store the boot program source file, where the boot program source file is an original file used to boot the computer hardware system, and the boot program source file may be pre-stored in the controller after being encrypted. For example, the controller may include a flash, and the flash may also be referred to as a flash memory controller. The flash may be configured to store the boot program source file, so that the controller performs check by using the boot program source file.

In a possible embodiment, the controller is a baseboard management controller BMC, and the BIOS file storage apparatus is a flash storing a BIOS file. The BMC is connected, through a first serial peripheral interface SPI bus, to the flash storing a BIOS file, and the BMC is connected to the computer hardware system through a second SPI bus.

According to a second aspect, an embodiment of this application further provides a computer boot method. The method is applied to a controller, the controller includes a security check kernel, and the security check kernel communicates with a control switch through an enable control pin of the control switch. The control switch is connected to the security check kernel through a first channel, the control switch is connected to a computer hardware system through a second channel, and the control switch is connected to a BIOS file storage apparatus through a third channel. The method includes: The security check kernel obtains a first boot program file in the BIOS file storage apparatus through the first channel and the third channel, where the first boot program file is a BIOS file pre-stored in the BIOS file storage apparatus. The security check kernel checks the first boot program file. The security check kernel sends a first instruction to the control switch through the enable control pin when the first boot program file is successfully checked. The control switch receives the first instruction through the enable control pin, and then the control switch connects the second channel to the third channel according to the first instruction, so that a connection between the BIOS file storage apparatus and the computer hardware system is successfully established when the second channel is connected to the third channel, and therefore the computer hardware system completes power-on and running by using the first boot program file.

In this embodiment of this application, the controller includes the security check kernel, and the security check kernel communicates with the control switch through the enable control pin of the control switch. The control switch is connected to the security check kernel through the first channel, the control switch is connected to the computer hardware system through the second channel, and the control switch is connected to the BIOS file storage apparatus through the third channel. The security check kernel first obtains the first boot program file in the BIOS file storage apparatus through the first channel and the third channel, where the first boot program file is the BIOS file pre-stored in the BIOS file storage apparatus, then the security check kernel checks the first boot program file, and the security check kernel sends the first instruction to the control switch through the enable control pin when the first boot program file is successfully checked. The control switch receives the first instruction through the enable control pin, and then the control switch connects the second channel to the third channel according to the first instruction, so that the connection between the BIOS file storage apparatus and the computer hardware system is successfully established when the second channel is connected to the third channel, and therefore the computer hardware system completes power-on and running by using the first boot program file. In this embodiment of this application, the security check kernel may check the first boot program file in the BIOS file storage apparatus, and the control switch establishes the connection between the BIOS file storage apparatus and the computer hardware system only when the first boot program file is successfully checked. In this case, the computer hardware system can read the first boot program file in the BIOS file storage apparatus to complete power-on and running. In this embodiment of this application, the security check kernel may check the first boot program file pre-stored in the BIOS file storage apparatus, to ensure that the first boot program file is secure, that is, to ensure that the first boot program file is not tampered with, so as to improve a boot security level of the computer hardware system, and avoid a security risk caused by using a tampered boot program file.

In a possible embodiment, the controller further includes a memory, the security check kernel is connected to the memory, and the memory pre-stores a boot program source file. That the security check kernel checks the first boot program file includes: The security check kernel performs check calculation by using a key and the boot program source file in the memory, to obtain a first check result. The security check kernel performs check calculation by using the key and the first boot program file, to obtain a second check result. The security check kernel determines, based on the first check result and the second check result, whether the first boot program file is successfully checked.

In a possible embodiment, the controller further includes a memory, the security check kernel is connected to the memory, and the memory pre-stores a boot program source file. The method further includes: The security check kernel writes the boot program source file to the BIOS file storage apparatus when the first boot program file fails to be checked. The security check kernel checks the boot program source file written to the BIOS file storage apparatus. The security check kernel sends the first instruction to the control switch through the enable control pin when the boot program source file written to the BIOS file storage apparatus is successfully checked. The control switch receives the first instruction through the enable control pin, and connects the second channel to the third channel according to the first instruction, so that the connection between the BIOS file storage apparatus and the computer hardware system is successfully established when the second channel is connected to the third channel, and therefore the computer hardware system completes power-on and running by using the boot program source file written to the BIOS file storage apparatus.

In a possible embodiment, the method further includes: When the first boot program file fails to be checked, the security check kernel deletes the first boot program file stored in the BIOS file storage apparatus. When the first boot program file fails to be checked, it indicates that the first boot program file stored in the BIOS file storage apparatus may be tampered with or damaged, that is, the first boot program file stored in the BIOS file storage apparatus is untrustworthy. The controller may further delete the first boot program file stored in the BIOS file storage apparatus, that is, the controller may erase the tampered first boot program file in the BIOS file storage apparatus, so that a flash in the controller may be configured to re-write an untampered boot program source file, to improve space usage efficiency of the flash.

In a possible embodiment, the BIOS file storage apparatus includes a primary BIOS file storage module and a secondary BIOS file storage module, the control switch is connected to the primary BIOS file storage module through a first subchannel, the control switch is connected to the secondary BIOS file storage module through a second subchannel, and both the primary BIOS file storage module and the secondary BIOS file storage module pre-store the first boot program file. That the security check kernel obtains a first boot program file in the BIOS file storage apparatus through the first channel and the third channel includes: The secure boot kernel obtains the first boot program file in the primary BIOS file storage module through the first channel and the first subchannel. That the secure boot kernel checks the first boot program file includes: The secure boot kernel checks the first boot program file in the primary BIOS file storage module. That the control switch connects the second channel to the third channel according to the first instruction, so that a connection between the BIOS file storage apparatus and the computer hardware system is successfully established when the second channel is connected to the third channel includes: The control switch connects the second channel to the first subchannel according to the first instruction, so that a connection between the primary BIOS file storage module and the computer hardware system is successfully established when the second channel is connected to the first subchannel.

In a possible embodiment, the method further includes: The secure boot kernel obtains the first boot program file in the secondary BIOS file storage module through the first channel and the second subchannel when the first boot program file in the primary BIOS file storage module fails to be checked. The secure boot kernel checks the first boot program file in the secondary BIOS file storage module. The security check kernel sends a second instruction to the control switch through the enable control pin when the first boot program file in the secondary BIOS file storage module is successfully checked. The control switch receives the second instruction through the enable control pin, and then the control switch connects the second channel to the second subchannel according to the second instruction, so that a connection between the secondary BIOS file storage module and the computer hardware system is successfully established when the second channel is connected to the second subchannel, and therefore the computer hardware system completes power-on and running by using the first boot program file.

In a possible embodiment, the controller further includes a memory, the security check kernel is connected to the memory, and the memory pre-stores a boot program source file. The method further includes: The secure boot kernel writes the boot program source file to the primary BIOS file storage module when the first boot program file in the secondary BIOS file storage module fails to be checked. The secure boot kernel checks the boot program source file written to the primary BIOS file storage module. The security check kernel sends the first instruction to the control switch through the enable control pin when the boot program source file written to the primary BIOS file storage module is successfully checked. The control switch receives the first instruction through the enable control pin, and then the control switch connects the second channel to the first subchannel according to the first instruction, so that the connection between the primary BIOS file storage module and the computer hardware system is successfully established when the second channel is connected to the first subchannel, and therefore the computer hardware system completes power-on and running by using the boot program source file written to the primary BIOS file storage module.

In a possible embodiment, the controller further includes a memory, the security check kernel is connected to the memory, and the memory pre-stores a boot program source file. The method further includes: The secure boot kernel writes the boot program source file to the secondary BIOS file storage module when the first boot program file in the secondary BIOS file storage module fails to be checked.

In a possible embodiment, the controller is a baseboard management controller BMC, and the BIOS file storage apparatus is a flash storing a BIOS file. The first channel is a first serial peripheral interface SPI bus, the second channel is a second SPI bus, and the third channel is a third SPI bus.

According to a third aspect, an embodiment of this application further provides a controller, including a processor and a memory. The processor and the memory communicate with each other, the memory is configured to store instructions, and the processor is configured to execute the instructions in the memory, to perform the method according to any one of the first aspect or the possible embodiments of the first aspect.

In the third aspect of this application, the composition modules of the controller may further perform the steps described in the first aspect and the possible embodiments. For details, refer to the descriptions in the first aspect and the possible embodiments.

According to a fourth aspect, an embodiment of this application further provides a controller. The controller includes a security check kernel, and the security check kernel communicates with a control switch through an enable control pin of the control switch. The control switch is connected to the security check kernel through a first channel, the control switch is connected to a computer hardware system through a second channel, and the control switch is connected to a BIOS file storage apparatus through a third channel. The security check kernel is configured to: obtain a first boot program file in the BIOS file storage apparatus through the first channel and the third channel, where the first boot program file is a BIOS file pre-stored in the BIOS file storage apparatus; check the first boot program file; and send a first instruction to the control switch through the enable control pin when the first boot program file is successfully checked. The control switch is configured to: receive the first instruction through the enable control pin, and then connect the second channel to the third channel according to the first instruction, so that a connection between the BIOS file storage apparatus and the computer hardware system is successfully established when the second channel is connected to the third channel, and therefore the computer hardware system completes power-on and running by using the first boot program file.

In a possible embodiment, the controller further includes a memory, the security check kernel is connected to the memory, and the memory pre-stores a boot program source file. The security check kernel is further configured to: perform check calculation by using a key and the boot program source file in the memory, to obtain a first check result; perform check calculation by using the key and the first boot program file, to obtain a second check result; and determine, based on the first check result and the second check result, whether the first boot program file is successfully checked.

In a possible embodiment, the controller further includes a memory, the security check kernel is connected to the memory, and the memory pre-stores a boot program source file. The security check kernel is further configured to: write the boot program source file to the BIOS file storage apparatus when the first boot program file fails to be checked; check the boot program source file written to the BIOS file storage apparatus; and send the first instruction to the control switch through the enable control pin when the boot program source file written to the BIOS file storage apparatus is successfully checked. The control switch is further configured to: receive the first instruction through the enable control pin, and connect the second channel to the third channel according to the first instruction, so that the connection between the BIOS file storage apparatus and the computer hardware system is successfully established when the second channel is connected to the third channel, and therefore the computer hardware system completes power-on and running by using the first boot program file.

In a possible embodiment, the security check kernel is further configured to: when the first boot program file fails to be checked, delete the first boot program file stored in the BIOS file storage apparatus.

In a possible embodiment, the BIOS file storage apparatus includes a primary BIOS file storage module and a secondary BIOS file storage module, the control switch is connected to the primary BIOS file storage module through a first subchannel, the control switch is connected to the secondary BIOS file storage module through a second subchannel, and both the primary BIOS file storage module and the secondary BIOS file storage module pre-store the first boot program file. The security check kernel is further configured to: obtain the first boot program file in the primary BIOS file storage module through the first channel and the first subchannel; and check the first boot program file in the primary BIOS file storage module. The control switch is further configured to connect the second channel to the first subchannel according to the first instruction, so that a connection between the primary BIOS file storage module and the computer hardware system is successfully established when the second channel is connected to the first subchannel.

In a possible embodiment, the secure boot kernel is further configured to: obtain the first boot program file in the secondary BIOS file storage module through the first channel and the second subchannel when the first boot program file in the primary BIOS file storage module fails to be checked; check the first boot program file in the secondary BIOS file storage module; and send a second instruction to the control switch through the enable control pin when the first boot program file in the secondary BIOS file storage module is successfully checked. The control switch is further configured to: receive the second instruction through the enable control pin, and connect the second channel to the second subchannel according to the second instruction, so that a connection between the secondary BIOS file storage module and the computer hardware system is successfully established when the second channel is connected to the second subchannel, and therefore the computer hardware system completes power-on and running by using the first boot program file in the secondary BIOS file storage module.

In a possible embodiment, the controller further includes a memory, the security check kernel is connected to the memory, and the memory pre-stores a boot program source file. The secure boot kernel is further configured to: write the boot program source file to the primary BIOS file storage module when the first boot program file in the secondary BIOS file storage module fails to be checked; check the boot program source file written to the primary BIOS file storage module; and send the first instruction to the control switch through the enable control pin when the boot program source file written to the primary BIOS file storage module is successfully checked. The control switch is further configured to: receive the first instruction through the enable control pin, and connect the second channel to the first subchannel according to the first instruction, so that the connection between the primary BIOS file storage module and the computer hardware system is successfully established when the second channel is connected to the first subchannel, and therefore the computer hardware system completes power-on and running by using the boot program source file written to the primary BIOS file storage module.

In a possible embodiment, the controller further includes a memory, the security check kernel is connected to the memory, and the memory pre-stores a boot program source file. The secure boot kernel is further configured to write the boot program source file to the secondary BIOS file storage module when the first boot program file in the secondary BIOS file storage module fails to be checked.

In a possible embodiment, the controller is a baseboard management controller BMC, and the BIOS file storage apparatus is a flash storing a BIOS file. The first channel is a first serial peripheral interface SPI bus, the second channel is a second SPI bus, and the third channel is a third SPI bus.

In the fourth aspect of this application, the composition modules of the controller may further perform the steps described in the second aspect and the possible embodiments. For details, refer to the descriptions in the second aspect and the possible embodiments.

According to a fifth aspect, an embodiment of this application provides a computer-readable storage medium. The computer-readable storage medium stores instructions, and when the instructions are run on a computer, the computer is enabled to perform the method according to the first aspect or the second aspect.

According to a sixth aspect, an embodiment of this application provides a computer program product including instructions. When the computer program product runs on a computer, the computer is enabled to perform the method according to the first aspect or the second aspect.

According to a seventh aspect, an embodiment of this application provides a controller. The controller may include an entity such as a terminal device or a chip, and the controller includes a processor and a memory. The memory is configured to store instructions, and the processor is configured to execute the instructions in the memory, so that the controller performs the method according to either of the first aspect or the second aspect.

According to an eighth aspect, this application provides a chip system. The chip system includes a processor, configured to support a controller in implementing functions in the foregoing aspects, for example, sending or processing data and/or information in the foregoing methods. In a possible design, the chip system further includes a memory. The memory is configured to store program instructions and data that are necessary for the controller. The chip system may include a chip, or may include a chip and another discrete component.

According to a ninth aspect, this application provides a computer boot system. The computer boot system includes a controller, a computer hardware system, and a basic input/output system BIOS file storage apparatus. The controller is separately connected to the computer hardware system and the BIOS file storage apparatus, and the controller is configured to perform the method according to either of the first aspect or the second aspect.

DESCRIPTION OF EMBODIMENTS

Embodiments of this application provide a computer boot method, a controller, a storage medium, and a system, to improve a boot security level of a computer, and avoid a security risk caused by using a tampered boot program file.

The following describes the embodiments of this application with reference to the accompanying drawings.

In the specification, claims, and the accompanying drawings of this application, the terms "first", "second", and the like are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of this application. In addition, the terms "include", "have" and any other variants thereof mean to cover the non-exclusive inclusion, so that a process, method, system, product, or device that includes a series of units is not necessarily limited to those units, but may include other units not expressly listed or inherent to such a process, method, product, or device.

Figure 1:
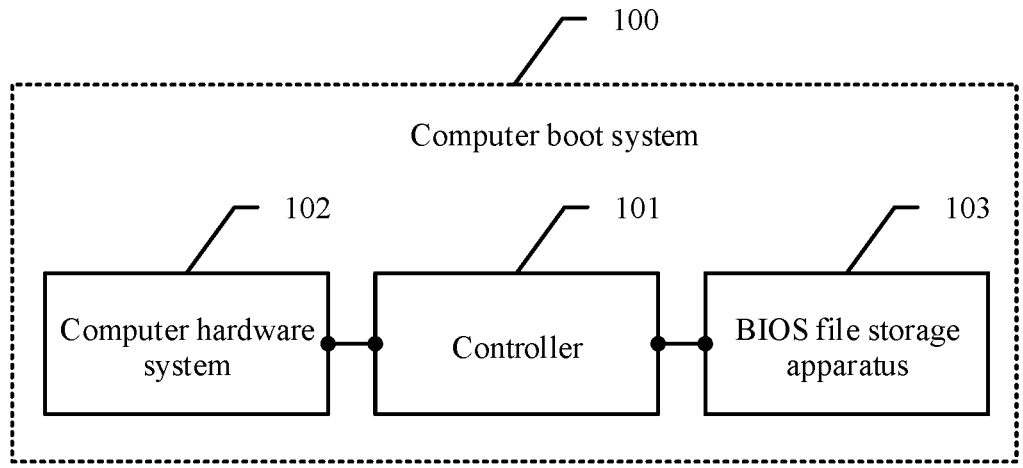
FIG. 1 is a schematic diagram of a composition structure of a computer boot system according to an embodiment of this application.

Technical solutions in the embodiments of this application may be applied to a computer boot system. As shown in FIG. 1, a computer boot system 100 may include a controller 101, a computer hardware system 102, and a basic input/output system (BIOS) file storage apparatus 103. The controller 101 is separately connected to the computer hardware system 102 and the BIOS file storage apparatus 103. For example, a channel is established between the controller 101 and the computer hardware system 102, and another channel is established between the controller 101 and the BIOS file storage apparatus 103.

The controller 101 may be configured to control whether the computer hardware system 102 can read a first boot program file stored in the BIOS file storage apparatus 103. Power-on and running is power-on and running, for example, turning on an alternating current (AC), and a voltage may be 220 volts. Specifically, the controller 101 may check the first boot program file in the BIOS file storage apparatus. Only when the first boot program file is successfully checked, the computer hardware system 102 can read the first boot program file stored in the BIOS file storage apparatus 103. When the first boot program file fails to be checked, the controller 101 may be configured to control the computer hardware system 102 not to be able to read the first boot program file stored in the BIOS file storage apparatus 103. A reason why the first boot program file fails to be checked may be that the first boot program file is tampered with or the first boot program file is damaged.

The BIOS file storage apparatus 103 may be configured to store the first boot program file, to provide a BIOS file for power-on and running of the computer hardware system 102.

When the computer hardware system 102 successfully establishes a connection to the BIOS file storage apparatus 103, the computer hardware system 102 may read the first boot program file stored in the BIOS file storage apparatus 103, to complete power-on and running by using the first boot program file.

In some embodiments of this application, the controller 101 may be a baseboard management controller (BMC). The BMC is an independent system independent of the computer hardware system, and the BMC may be configured to control whether the computer hardware system 102 can read the first boot program file stored in the BIOS file storage apparatus 103. In addition, the BMC is further configured to: provide necessary functions for the computer hardware system, such as fault diagnosis, fault reporting, fault alarm, fault log collection, and device running status monitoring, and provide a real-time online upgrade capability for major software of the computer hardware system and the like, to ensure normal operation and maintenance of the computer hardware system.

In some embodiments of this application, the BIOS file storage apparatus 103 is a storage apparatus configured to store a BIOS file. For example, the BIOS file storage apparatus may be specifically a flash having an SPI interface. A BIOS may also be referred to as a BIOS hardware system, and the BIOS may be configured to boot, under control of the controller 101, the computer hardware system 102 to be powered on and run. The BIOS stores a boot program file, and the boot program file may include: booting the computer hardware system 102 to be powered on and run. The BIOS is a group of programs that are built into a flash chip on a mainboard of a computer. The BIOS stores the most important basic input and output programs of the computer, system setting information, a power-on self-check program, and a system self-boot program. A main function of the BIOS is to provide the most direct underlying hardware setting and control for the computer. In this embodiment of this application, whether a connection can be established between the BIOS file storage apparatus 103 and the computer hardware system 102 is determined by the controller 101 based on whether a boot program file pre-stored in the BIOS file storage apparatus is successfully checked. The boot program file pre-stored in the BIOS file storage apparatus may also be referred to as a BIOS original file, a BIOS source program, or the like. In this embodiment of this application, when the boot program file is tampered with or damaged, the controller 101 determines that the check fails. In this case, the connection between the BIOS file storage apparatus 103 and the computer hardware system 102 cannot be established. The computer hardware system 102 cannot read the first boot program file stored in the BIOS file storage apparatus 103, to avoid a security risk caused by using the tampered boot program file.

In some embodiments of this application, the computer hardware system 102 is a hardware system booting a computer. The computer may be a terminal device, a network device, a server, or the like. For example, the computer hardware system 102 may be an x86 system, or the computer hardware system may be an advanced RISC machine (ARM) system. Specifically, the x86 system is an x86 computer system based on an Intel platform, and may perform related computation based on a Windows operating system or a Linux operating system to complete specific software and hardware functions. A specific type of the computer hardware system 102 is not limited in this embodiment of this application. The computer hardware system 102 may be a hardware system of various types of general-purpose servers, provided that the computer hardware system 102 reads the first boot program file in the BIOS file storage apparatus 103 to complete power-on and running.

In some embodiments of this application, the controller 101 is a BMC, and the BIOS file storage apparatus 103 is a flash storing a BIOS file. The BMC is connected, through a first serial peripheral interface (SPI) bus, to the flash storing a BIOS file, and the BMC is connected to the computer hardware system through a second SPI bus. The SPI bus is a standard four-wire synchronous bidirectional serial bus, and the computer hardware system may be an x86 system. In the x86 system, the SPI bus is configured to connect the x86 system to the flash storing a BIOS file. In a power-on process, the x86 system communicates, through the SPI bus, with the flash storing a BIOS file to complete basic power-on configuration of the x86 system, so as to ensure that the x86 system can be powered on and run.

Figure 2:
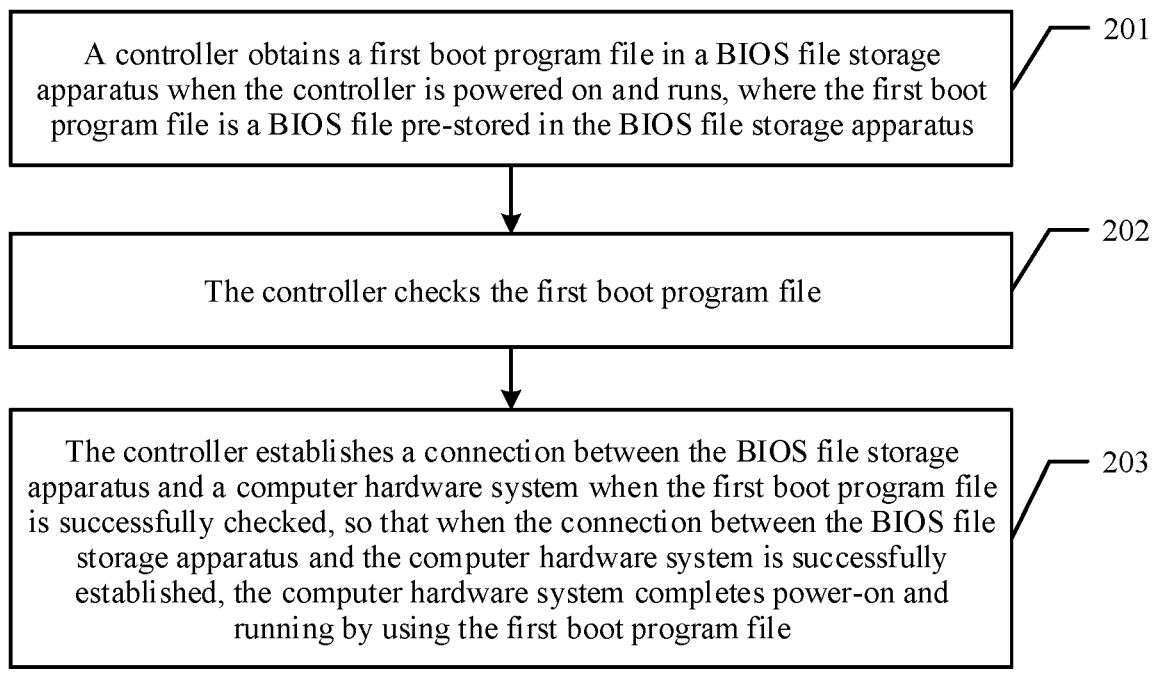
FIG. 2 is a schematic block flowchart of a computer boot method according to an embodiment of this application.

The following describes, from a perspective of a controller, a computer boot method provided in an embodiment of this application. As shown in FIG. 2, a computer boot method provided in this embodiment of this application may be applied to the foregoing controller. It can be learned from FIG. 1 that the controller is separately connected to a computer hardware system and a BIOS file storage apparatus. The method may include the following steps.

201: The controller obtains a first boot program file in the BIOS file storage apparatus when the controller is powered on and runs, where the first boot program file is a BIOS file pre-stored in the BIOS file storage apparatus.

In this embodiment of this application, the controller may be configured to control whether the computer hardware system can read the first boot program file stored in the BIOS file storage apparatus. In this embodiment of this application, the controller is first powered on, so that the controller is powered on and runs. The controller may establish a communication connection to the BIOS file storage apparatus, so that the controller obtains the first boot program file in the BIOS file storage apparatus. The first boot program file is the BIOS file pre-stored in the BIOS file storage apparatus, and the first boot program file is a boot file used for power-on and running of the computer hardware system. For example, the BIOS file storage apparatus is a flash. The flash stores the first boot program file. The flash is a storage chip. The flash may be configured to store the first boot program file. For example, the first boot program file may be a BIOS original file or a BIOS source program. The controller may read the first boot program file from the flash, and then the controller performs step 202.

It should be noted that, when the controller is powered on and runs, the computer hardware system is not yet connected to the BIOS file storage apparatus. In this case, the computer hardware system cannot perform power-on configuration and self-check. Therefore, the computer hardware system is not booted yet.

202: The controller checks the first boot program file.

In this embodiment of this application, after the controller obtains the first boot program file in the BIOS file storage apparatus, the controller may check the first boot program file. For example, the controller may perform trustworthiness check on the first boot program file by using a trusted algorithm. If the first boot program file is damaged or tampered with, the first boot program file fails to be checked. Alternatively, if the first boot program is not damaged or tampered with, that is, the first boot program file is the same as a boot program file originally written to the BIOS file storage apparatus, the first boot program file is successfully checked. In this embodiment of this application, the controller determines, based on a check result of the first boot program file, whether to perform step 203. The controller may perform step 203 when the first boot program file is successfully checked.

In some embodiments of this application, the controller may check the first boot program file in a plurality of methods. For example, the controller may check the first boot program file by using a plurality of check algorithms. For example, the check algorithm used by the controller may include cyclic redundancy check (CRC). Further, in some embodiments of this application, step 202 in which the controller checks the first boot program file includes:

A1: The controller performs check calculation by using a key and a boot program source file in the controller, to obtain a first check result, where the boot program source file is a BIOS file pre-stored in the controller.

A2: The controller performs check calculation by using the key and the first boot program file, to obtain a second check result.

A3: The controller determines, based on the first check result and the second check result, whether the first boot program file is successfully checked.

The controller may pre-store the key and the boot program source file, where a binding relationship exists between the key and the boot program source file, the boot program source file is a BIOS file used to boot the computer hardware system, and the boot program source file may be pre-stored in the controller after being encrypted. For example, the controller may include a flash, and the flash may also be referred to as a flash memory controller. The flash in the controller may be configured to store the key and the boot program source file, so that the controller performs security check by using the boot program source file.

The controller first obtains the key and the boot program source file, and then performs check calculation by using the key and the boot program source file in the controller, to obtain the first check result. Similarly, the controller may further perform check calculation by using the key and the first boot program file, to obtain the second check result. Finally, the controller compares the two check results, and may determine, based on the first check result and the second check result, whether the first boot program file is successfully checked. For example, if the first check result is the same as the second check result, the controller determines that the boot program source file stored in the controller is the same as the first boot program file stored in the BIOS file storage apparatus, that is, the first boot program file stored in the BIOS file storage apparatus is not tampered with. In this case, an output check result is that the first boot program file is successfully checked. For another example, if the first check result is different from the second check result, the controller determines that the boot program source file stored in the controller is different from the first boot program file stored in the BIOS file storage apparatus, that is, the first boot program file stored in the BIOS file storage apparatus may be tampered with or damaged. In this case, an output check result is that the first boot program file fails to be checked.

It should be noted that, that the controller performs check calculation by using a key and a boot program source file in the controller, to obtain a first check result may be generating the first check result each time the first boot program file needs to be checked, or may be pre-calculating the first check result, storing the first check result in a flash of the controller, and reading the first check result from the flash of the controller each time the first boot program file needs to be checked. A manner of obtaining the first check result is not limited herein.

203: The controller establishes a connection between the BIOS file storage apparatus and the computer hardware system when the first boot program file is successfully checked, so that when the connection between the BIOS file storage apparatus and the computer hardware system is successfully established, the computer hardware system completes power-on and running by using the first boot program file.

In this embodiment of this application, when the first boot program file is successfully checked, it indicates that the first boot program file stored in the BIOS file storage apparatus is not tampered with, that is, the first boot program file stored in the BIOS file storage apparatus is secure and trustworthy. In this case, the controller establishes the connection between the BIOS file storage apparatus and the computer hardware system, for example, the controller connects the BIOS file storage apparatus to the computer hardware system through a channel, so that the computer hardware system completes power-on and running by using the first boot program file. In this embodiment of this application, only when the first boot program file stored in the BIOS file storage apparatus is secure and trustworthy, the computer hardware system can read the first boot program file stored in the BIOS file storage apparatus, and can perform power-on and running by using the first boot program file, to improve a boot security level of the computer hardware system, and avoid a security risk caused by using a tampered boot program file.

It can be learned from the descriptions of the examples of the foregoing embodiments that the controller is separately connected to the computer hardware system and the BIOS file storage apparatus. The controller first obtains the first boot program file in the BIOS file storage apparatus when the controller is powered on and runs, where the first boot program file is the BIOS file pre-stored in the BIOS file storage apparatus. Then, the controller checks the first boot program file. The controller establishes the connection between the BIOS file storage apparatus and the computer hardware system when the first boot program file is successfully checked, so that when the connection between the BIOS file storage apparatus and the computer hardware system is successfully established, the computer hardware system finally completes power-on and running by using the first boot program file. In this embodiment of this application, the controller may check the first boot program file in the BIOS file storage apparatus, and the controller establishes the connection between the BIOS file storage apparatus and the computer hardware system only when the first boot program file is successfully checked. In this case, the computer hardware system can read the first boot program file in the BIOS file storage apparatus to complete power-on and running. In this embodiment of this application, the controller may check the first boot program file pre-stored in the BIOS file storage apparatus, to ensure that the first boot program file is secure, that is, to ensure that the first boot program file is not tampered with, so as to improve a boot security level of the computer hardware system, and avoid a security risk caused by using a tampered boot program file.

Figure 3:
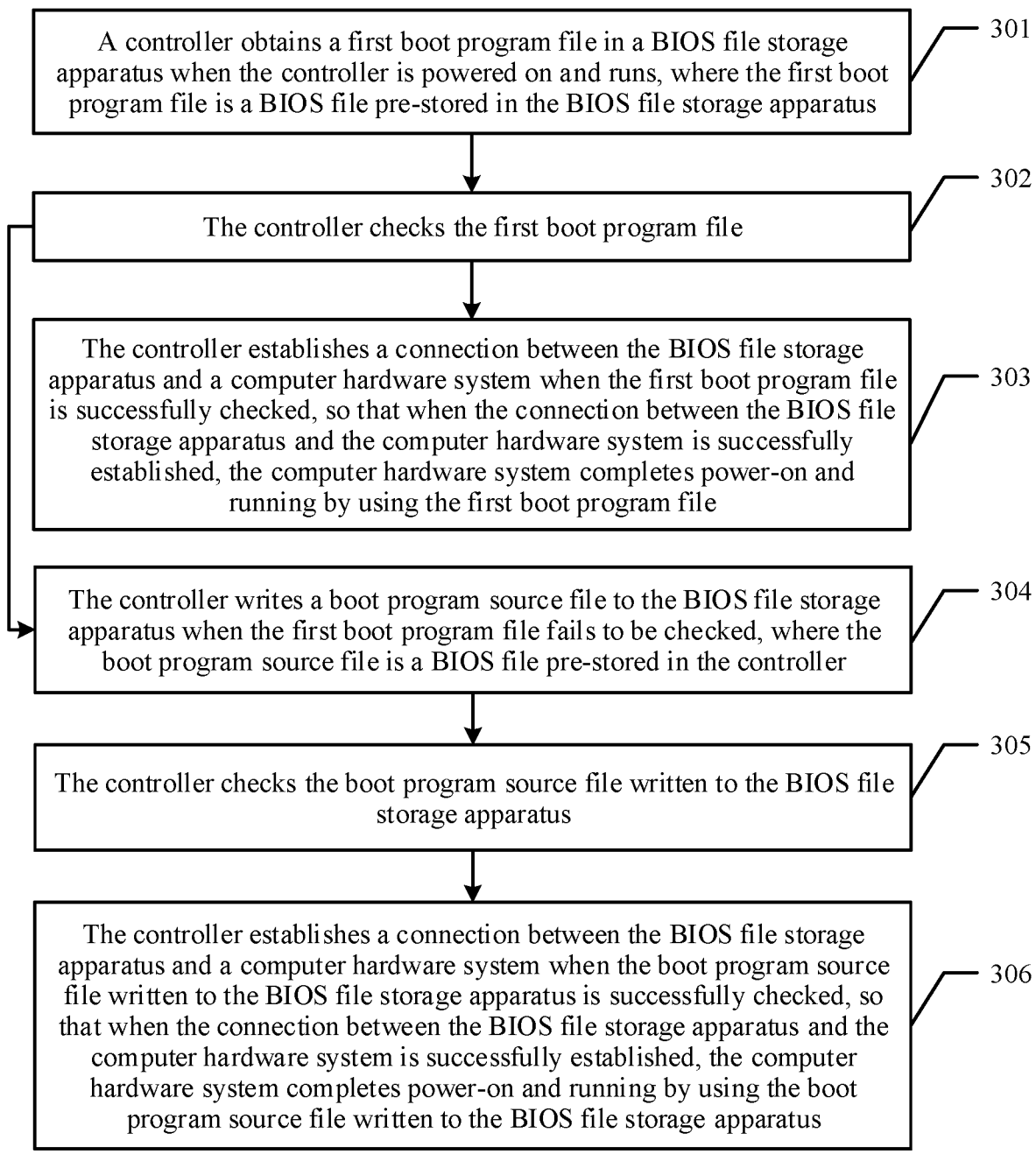
FIG. 3 is a schematic block flowchart of a computer boot method according to an embodiment of this application.

As shown in FIG. 3, a computer boot method provided in this embodiment of this application may be applied to the foregoing controller. It can be learned from FIG. 1 that the controller is separately connected to a computer hardware system and a BIOS file storage apparatus. The method may include the following steps.

301: The controller obtains a first boot program file in the BIOS file storage apparatus when the controller is powered on and runs, where the first boot program file is a BIOS file pre-stored in the BIOS file storage apparatus.

302: The controller checks the first boot program file.

The controller performs step 303 when the first boot program file is successfully checked; or the controller performs step 304 to step 306 when the first boot program file fails to be checked.

303: The controller establishes a connection between the BIOS file storage apparatus and the computer hardware system when the first boot program file is successfully checked, so that when the connection between the BIOS file storage apparatus and the computer hardware system is successfully established, the computer hardware system completes power-on and running by using the first boot program file.

Step 301 to step 303 are similar to step 201 to step 203. For details, refer to the descriptions in the foregoing embodiments.

304: The controller writes a boot program source file to the BIOS file storage apparatus when the first boot program file fails to be checked, where the boot program source file is a BIOS file pre-stored in the controller.

When the first boot program file fails to be checked, it indicates that the first boot program file stored in the BIOS file storage apparatus may be tampered with or damaged, that is, the first boot program file stored in the BIOS file storage apparatus is untrustworthy. The controller may pre-store the boot program source file, where the boot program source file is an original file used to boot the computer hardware system, and the boot program source file may be pre-stored in the controller after being encrypted. For example, the controller may include a flash, and the flash may also be referred to as a flash memory controller. The flash may be configured to store the boot program source file, so that the controller performs check by using the boot program source file. The boot program source file may be further used to recover the tampered first boot program file in the BIOS file storage apparatus, so that an untampered boot program source file is re-written to the BIOS file storage apparatus. In this way, the computer hardware system can read the boot program source file re-written to the BIOS file storage apparatus to perform power-on and running by using the boot program source file, so as to avoid a security risk caused by using the tampered boot program file.

In some embodiments of this application, the controller may further perform the following step:

deleting, by the controller, the first boot program file stored in the BIOS file storage apparatus.

When the first boot program file fails to be checked, it indicates that the first boot program file stored in the BIOS file storage apparatus may be tampered with or damaged, that is, the first boot program file stored in the BIOS file storage apparatus is untrustworthy. The controller may further delete the first boot program file stored in the BIOS file storage apparatus, that is, the controller may erase the tampered first boot program file in the BIOS file storage apparatus, so that the flash in the controller may be configured to re-write an untampered boot program source file, to improve space usage efficiency of the flash.

305: The controller checks the boot program source file written to the BIOS file storage apparatus.

After the boot program source file is written to the BIOS file storage apparatus, the controller may read the boot program source file written to the BIOS file storage apparatus again, and check the boot program source file written to the BIOS file storage apparatus. For a check manner, refer to the descriptions of step 202 in the foregoing embodiment. Details are not described herein.

306: The controller establishes a connection between the BIOS file storage apparatus and the computer hardware system when the boot program source file written to the BIOS file storage apparatus is successfully checked, so that when the connection between the BIOS file storage apparatus and the computer hardware system is successfully established, the computer hardware system completes power-on and running by using the boot program source file written to the BIOS file storage apparatus.

In this embodiment of this application, the boot program source file is re-written to the BIOS file storage apparatus, and the boot program source file written to the BIOS file storage apparatus is successfully checked. In this case, the controller establishes the connection between the BIOS file storage apparatus and the computer hardware system, so that when the connection between the BIOS file storage apparatus and the computer hardware system is successfully established, the computer hardware system completes power-on and running by using the boot program source file written to the BIOS file storage apparatus. In this embodiment of this application, the controller has a function of re-writing the boot program source file to the BIOS file storage apparatus, so that the boot program source file stored in the BIOS file storage apparatus is secure and trustworthy. In this way, the computer hardware system can read the first boot program file stored in the BIOS file storage apparatus to perform power-on and running by using the first boot program file, so as to improve a boot security level of the computer hardware system, and avoid a security risk caused by using a tampered boot program file.

Figure 4:
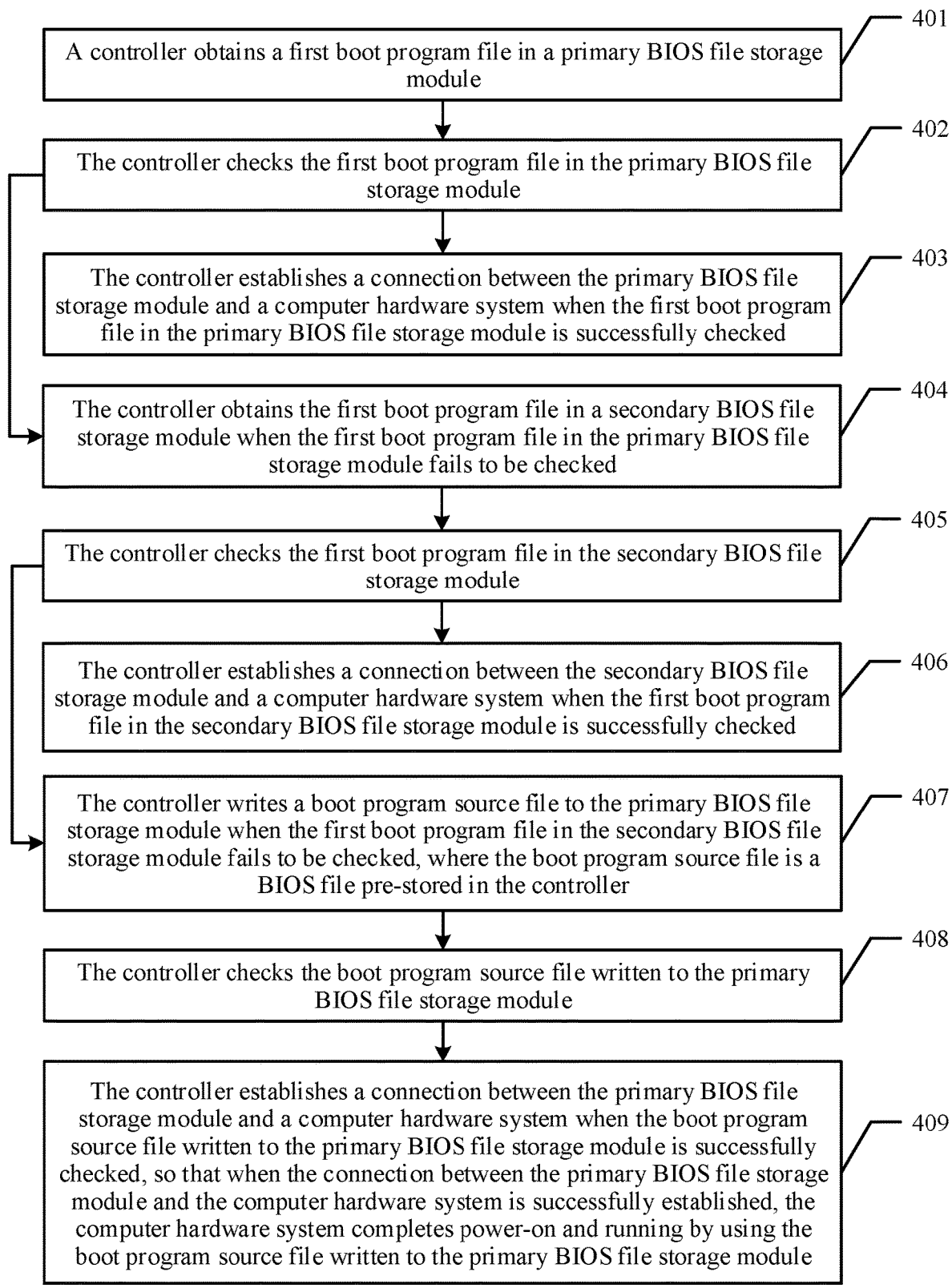
FIG. 4 is a schematic block flowchart of a computer boot method according to an embodiment of this application.

As shown in FIG. 4, a computer boot method provided in this embodiment of this application may be applied to the foregoing controller. It can be learned from FIG. 1 that the controller is separately connected to a computer hardware system and a BIOS file storage apparatus. The BIOS file storage apparatus includes a primary BIOS file storage module and a secondary BIOS file storage module, that is, the BIOS file storage apparatus may include two BIOS file storage modules having a primary/secondary backup function. For example, the primary BIOS file storage module may be a primary BIOS hardware system, and the secondary BIOS file storage module may be a secondary BIOS hardware system. The controller is separately connected to the primary BIOS file storage module and the secondary BIOS file storage module, and both the primary BIOS file storage module and the secondary BIOS file storage module pre-store a first boot program file, that is, the two BIOS file storage modules store a same first boot program file.

In this embodiment of this application, the controller preferentially interacts with the primary BIOS file storage module. When the first boot program file in the primary BIOS file storage module fails to be checked, the controller interacts with the secondary BIOS file storage module. Only when the first boot program file in the secondary BIOS file storage module is successfully checked, the computer hardware system can read the first boot program file stored in the BIOS file storage apparatus to perform power-on and running by using the first boot program file. In this embodiment of this application, the BIOS file storage apparatus may be implemented by using the two BIOS file storage modules, to improve a probability that the computer hardware system is successfully powered on and successfully runs, and ensure stability of the computer hardware system. The computer boot method provided in this embodiment of this application may include the following steps.

401: The controller obtains the first boot program file in the primary BIOS file storage module.

In this embodiment of this application, the controller may be configured to control whether the computer hardware system can read the first boot program file stored in the primary BIOS file storage module, and the computer hardware system can perform power-on and running by using the first boot program file only when reading the first boot program file. After a computer is powered on, the controller is first powered on, so that the controller is powered on and runs. The controller may establish a communication connection to the primary BIOS file storage module, so that the controller obtains the first boot program file in the primary BIOS file storage module. The first boot program file is a BIOS file pre-stored in the primary BIOS file storage module, and the first boot program file is a boot file used when the computer hardware system is powered on and runs.

402: The controller checks the first boot program file in the primary BIOS file storage module.

In this embodiment of this application, after the controller obtains the first boot program file in the primary BIOS file storage module, the controller may check the first boot program file. For example, the controller may perform trustworthiness check on the first boot program file by using a trusted algorithm. If the first boot program file is damaged or tampered with, the first boot program file fails to be checked. Alternatively, if the first boot program is not damaged or tampered with, that is, the first boot program file is the same as a boot program file originally written to the primary BIOS file storage module, the first boot program file is successfully checked. In this embodiment of this application, the controller determines, based on a check result of the first boot program file, whether to perform step 403. The controller may perform step 403 when the first boot program file is successfully checked. The controller performs step 404 to step 406 when the first boot program file fails to be checked.

403: The controller establishes a connection between the primary BIOS file storage module and the computer hardware system when the first boot program file in the primary BIOS file storage module is successfully checked.

In this embodiment of this application, when the first boot program file is successfully checked, it indicates that the first boot program file stored in the primary BIOS file storage module is not tampered with, that is, the first boot program file stored in the primary BIOS file storage module is secure and trustworthy. In this case, the controller establishes the connection between the primary BIOS file storage module and the computer hardware system, for example, the controller connects the primary BIOS file storage module to the computer hardware system through a channel, so that the computer hardware system completes power-on and running by using the first boot program file. In this embodiment of this application, when the first boot program file stored in the primary BIOS file storage module is secure and trustworthy, the computer hardware system can read the first boot program file stored in the primary BIOS file storage module, and the computer hardware system can perform power-on and running by using the first boot program file only when reading the first boot program file, to improve a boot security level of the computer hardware system, and avoid a security risk caused by using a tampered boot program file.

404: The controller obtains the first boot program file in the secondary BIOS file storage module when the first boot program file in the primary BIOS file storage module fails to be checked.

In this embodiment of this application, the controller may be configured to control whether the computer hardware system can read the first boot program file stored in the secondary BIOS file storage module, and the computer hardware system can perform power-on and running by using the first boot program file only when reading the first boot program file. After the controller is powered on and runs, the controller may establish a communication connection to the secondary BIOS file storage module, so that the controller obtains the first boot program file in the secondary BIOS file storage module. The first boot program file is a BIOS file pre-stored in the secondary BIOS file storage module, and the first boot program file is a boot file used when the computer hardware system is powered on and runs.

405: The controller checks the first boot program file in the secondary BIOS file storage module.

In this embodiment of this application, after the controller obtains the first boot program file in the secondary BIOS file storage module, the controller may check the first boot program file. For example, the controller may perform trustworthiness check on the first boot program file by using a trusted algorithm. If the first boot program file is damaged or tampered with, the first boot program file fails to be checked. Alternatively, if the first boot program is not damaged or tampered with, that is, the first boot program file is the same as a boot program file originally written to the secondary BIOS file storage module, the first boot program file is successfully checked. In this embodiment of this application, the controller determines, based on a check result of the first boot program file, whether to perform step 406. The controller may perform step 406 when the first boot program file is successfully checked. The controller performs step 407 to step 409 when the first boot program file fails to be checked.

406: The controller establishes a connection between the secondary BIOS file storage module and the computer hardware system when the first boot program file in the secondary BIOS file storage module is successfully checked.

In this embodiment of this application, when the first boot program file is successfully checked, it indicates that the first boot program file stored in the secondary BIOS file storage module is not tampered with, that is, the first boot program file stored in the secondary BIOS file storage module is secure and trustworthy. In this case, the controller establishes the connection between the secondary BIOS file storage module and the computer hardware system, for example, the controller connects the secondary BIOS file storage module to the computer hardware system through a channel, so that the computer hardware system completes power-on and running by using the first boot program file. In this embodiment of this application, only when the first boot program file stored in the secondary BIOS file storage module is secure and trustworthy, the computer hardware system can read the first boot program file stored in the secondary BIOS file storage module, and the computer hardware system can perform power-on and running by using the first boot program file only when reading the first boot program file, to improve a boot security level of the computer hardware system, and avoid a security risk caused by using a tampered boot program file.

407: The controller writes a boot program source file to the primary BIOS file storage module when the first boot program file in the secondary BIOS file storage module fails to be checked, where the boot program source file is a BIOS file pre-stored in the controller.

When the first boot program file in the secondary BIOS file storage module fails to be checked, it indicates that the first boot program file stored in the secondary BIOS file storage module may be tampered with or damaged, that is, the first boot program file stored in the secondary BIOS file storage module is untrustworthy. The controller may pre-store the boot program source file, where the boot program source file is an original file used to boot the computer hardware system, and the boot program source file may be pre-stored in the controller after being encrypted. For example, the controller may include a flash, and the flash may also be referred to as a flash memory controller. The flash may be configured to store the boot program source file, so that the controller performs check by using the boot program source file. The boot program source file may be further used to recover the tampered first boot program file in the primary BIOS file storage module, so that an untampered boot program source file is re-written to the primary BIOS file storage module. In this way, the computer hardware system can read the untampered boot program source file in the primary BIOS file storage module to complete power-on and running, so as to avoid a security risk caused by using the tampered boot program file.

408: The controller checks the boot program source file written to the primary BIOS file storage module.

After the boot program source file is written to the primary BIOS file storage module, the controller may read the boot program source file written to the primary BIOS file storage module, and check the boot program source file written to the primary BIOS file storage module. For a check manner, refer to the descriptions of step 202 in the foregoing embodiment. Details are not described herein.

409: The controller establishes a connection between the primary BIOS file storage module and the computer hardware system when the boot program source file written to the primary BIOS file storage module is successfully checked, so that when the connection between the primary BIOS file storage module and the computer hardware system is successfully established, the computer hardware system completes power-on and running by using the boot program source file written to the primary BIOS file storage module.

In this embodiment of this application, the boot program source file is re-written to the primary BIOS file storage module, and the boot program source file written to the primary BIOS file storage module is successfully checked. In this case, the controller establishes the connection between the primary BIOS file storage module and the computer hardware system, so that when the connection between the primary BIOS file storage module and the computer hardware system is successfully established, the computer hardware system completes power-on and running by using the boot program source file written to the primary BIOS file storage module. In this embodiment of this application, the controller has a function of re-writing the boot program source file to the primary BIOS file storage module, so that the boot program source file stored in the primary BIOS file storage module is secure and trustworthy. In this way, the computer hardware system can read the boot program source file in the primary BIOS file storage module to complete power-on and running, so as to improve a boot security level of the computer hardware system, and avoid a security risk caused by using a tampered boot program file.

In some embodiments of this application, the controller may further perform the following step:

writing, by the controller, a boot program source file to the secondary BIOS file storage module when the first boot program file in the secondary BIOS file storage module fails to be checked, where the boot program source file is a BIOS file pre-stored in the controller.

When the first boot program file fails to be checked, it indicates that the first boot program file stored in the secondary BIOS file storage module may be tampered with or damaged, that is, the first boot program file stored in the secondary BIOS file storage module is untrustworthy. The controller may pre-store the boot program source file, where the boot program source file is an original file used to boot the computer hardware system, and the boot program source file may be pre-stored in the controller after being encrypted. For example, the controller may include a flash, and the flash may also be referred to as a flash memory controller. The flash may be configured to store the boot program source file, so that the controller performs check by using the boot program source file.

Figure 5A:
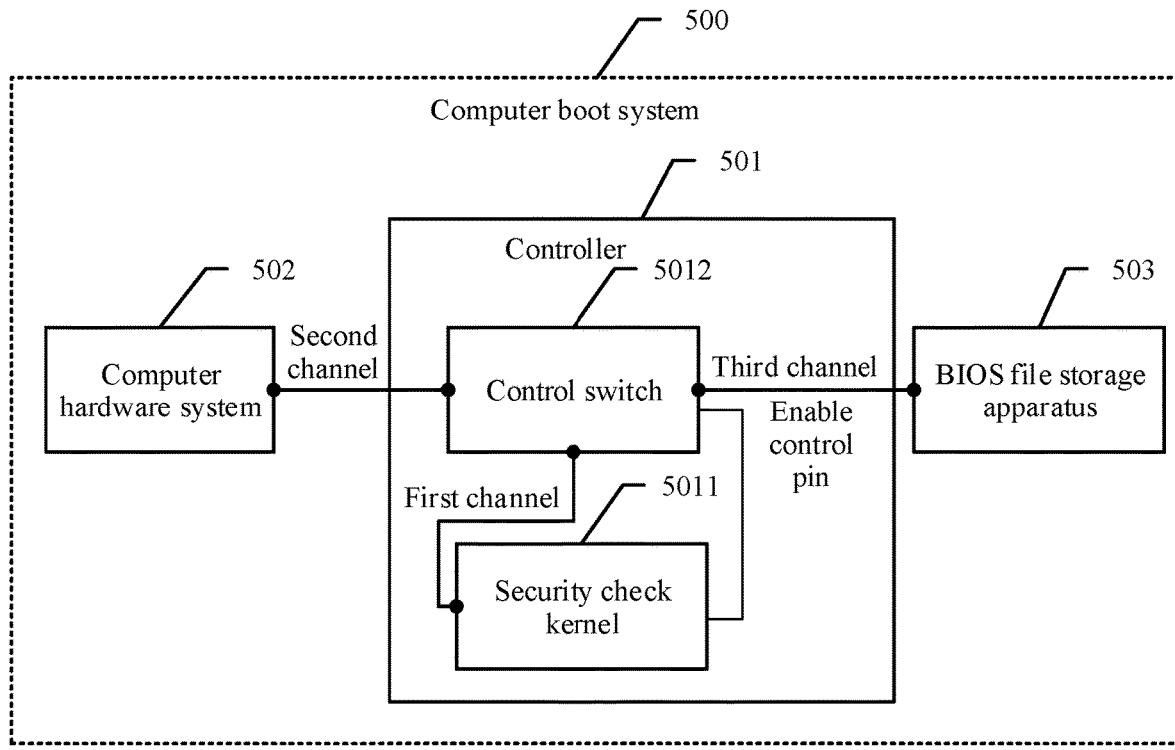
FIG. 5a is a schematic diagram of a composition structure of a computer boot system according to an embodiment of this application.
Figure 5B:
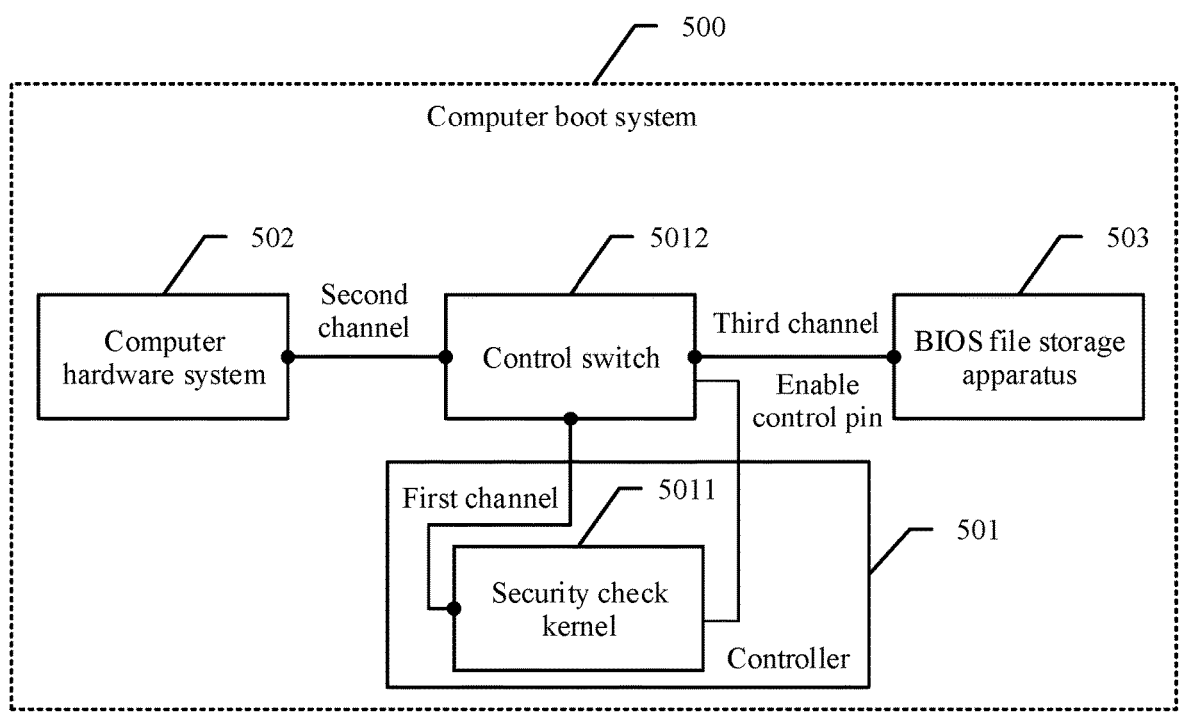
FIG. 5b is another schematic diagram of a composition structure of a computer boot system according to an embodiment of this application.

The technical solutions in the embodiments of this application may be applied to a computer boot system. As shown in FIG. 5a and FIG. 5b, a computer boot system 500 may include a controller 501, a computer hardware system 502, and a BIOS file storage apparatus 503. The controller 501 is deployed between the BIOS file storage apparatus 503 and the computer hardware system 502, and the controller 501 is separately connected to the computer hardware system 502 and the BIOS file storage apparatus 503.

The controller 501 includes a security check kernel 5011, and the security check kernel 5011 communicates with a control switch 5012 through an enable control pin of the control switch 5012. The security check kernel 5011 may be configured to control whether the computer hardware system 502 can read a first boot program file in the BIOS file storage apparatus 503 to complete power-on and running. Power-on and running is power-on and running, for example, turning on an AC, and a voltage may be 220 volts. Specifically, the security check kernel 5011 may check the first boot program file in the BIOS file storage apparatus. Only when the first boot program file is successfully checked, the security check kernel 5011 may be configured to control the computer hardware system 502 to be able to read the first boot program file in the BIOS file storage apparatus 503 to complete power-on and running. When the first boot program file fails to be checked, the security check kernel 5011 may be configured to control the computer hardware system 502 not to be able to read the first boot program file in the BIOS file storage apparatus 503, so that the computer hardware system 502 cannot be powered on and run. A reason why the first boot program file fails to be checked may be that the first boot program file is tampered with, or the first boot program file is damaged.

In this embodiment of this application, for example, as shown in FIG. 5a, the control switch 5012 may belong to the controller 501, that is, the controller 501 includes the security check kernel 5011 and the control switch 5012. It is not limited that, as shown in FIG. 5b, the controller 5012 may alternatively be a logical switch independent of the controller 501. The control switch 5012 is connected to the security check kernel 5011 through a first channel, the control switch 5012 is connected to the computer hardware system 502 through a second channel, and the control switch 5012 is connected to the BIOS file storage apparatus 503 through a third channel.

The BIOS file storage apparatus 503 may be configured to store the first boot program file.

The computer hardware system 502 may be configured to: when the BIOS file storage apparatus 503 is connected to the computer hardware system 502, read the first boot program file in the BIOS file storage apparatus 503 to complete power-on and running by using the first boot program file.

In some embodiments of this application, the controller 501 further includes a memory, the security check kernel 5011 is connected to the memory, and the memory pre-stores a boot program source file. For example, the memory may be a flash.

Figure 6:
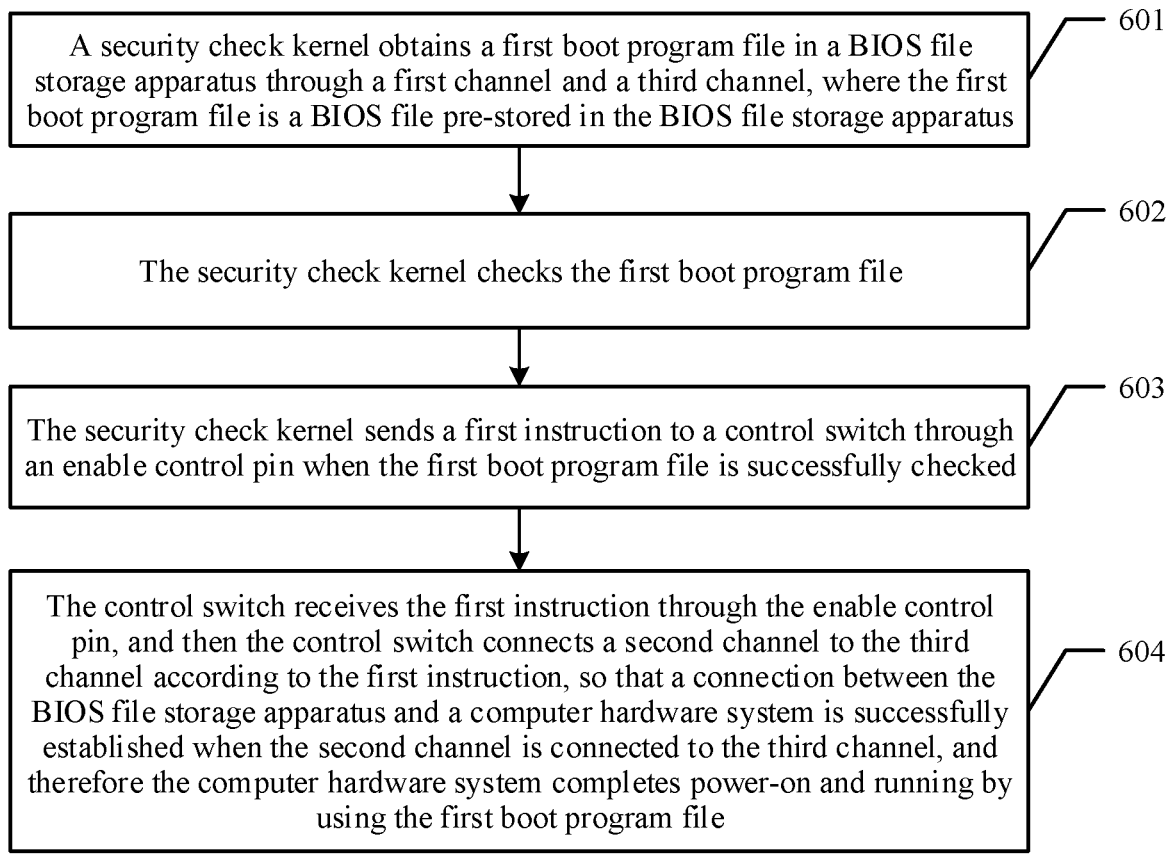
FIG. 6 is a schematic block flowchart of a computer boot method according to an embodiment of this application.

The following describes, from a perspective of a controller, a computer boot method provided in an embodiment of this application. As shown in FIG. 6, a computer boot method provided in this embodiment of this application may be applied to the foregoing controller. It can be learned from FIG. 5a and FIG. 5b that the security check kernel 5011 may control whether the control switch 5012 is closed, and when the control switch 5012 is closed, a computer hardware system and a BIOS file storage apparatus are connected together. The method may include the following steps.

601: The security check kernel obtains a first boot program file in the BIOS file storage apparatus through a first channel and a third channel, where the first boot program file is a BIOS file pre-stored in the BIOS file storage apparatus.

The security check kernel is a kernel module that has a check function for the first boot program file. In step 601, the security check kernel is connected to a control switch through the first channel, and the control switch is connected to the BIOS file storage apparatus through the third channel. Therefore, when the first channel is connected to a second channel, the security check kernel may establish a communication connection to the BIOS file storage apparatus. In this case, the security check kernel may obtain the first boot program file. For descriptions of the first boot program file, refer to the detailed descriptions of step 201 in the foregoing embodiment.

602: The security check kernel checks the first boot program file.

For descriptions that the security check kernel checks the first boot program file, refer to the detailed descriptions of step 202 in the foregoing embodiment.

603: The security check kernel sends a first instruction to the control switch through an enable control pin when the first boot program file is successfully checked.

In this embodiment of this application, when the first boot program file is successfully checked, it indicates that the first boot program file stored in the BIOS file storage apparatus is not tampered with, that is, the first boot program file stored in the BIOS file storage apparatus is secure and trustworthy. In this case, the security check kernel sends the first instruction to the control switch through the enable control pin, where the first instruction is used to control the control switch to connect the second channel to the third channel.

The enable control pin is a communications interface configured on the control switch, and the security check kernel may deliver a specific instruction to the control switch by using the security check kernel.

604: The control switch receives the first instruction through the enable control pin, and then the control switch connects the second channel to the third channel according to the first instruction, so that a connection between the BIOS file storage apparatus and the computer hardware system is successfully established when the second channel is connected to the third channel, and therefore the computer hardware system completes power-on and running by using the first boot program file.

In this embodiment of this application, the control switch is connected to the computer hardware system through the second channel, and the control switch is connected to the BIOS file storage apparatus through the third channel. Therefore, the connection between the BIOS file storage apparatus and the computer hardware system is successfully established when the third channel is connected to the second channel, and therefore the computer hardware system can read the first boot program file from the BIOS file storage apparatus, and then complete power-on and running by using the first boot program file.

In some embodiments of this application, the security check kernel may check the first boot program file in a plurality of methods. For example, the controller may check the first boot program file by using a plurality of check algorithms. For example, the check algorithm used by the controller may include CRC. Further, in some embodiments of this application, the controller further includes a memory, the security check kernel is connected to the memory, and the memory pre-stores a boot program source file.

Step 602 in which the security check kernel checks the first boot program file includes:

B1: The security check kernel performs check calculation by using a key and the boot program source file in the memory, to obtain a first check result.

B2: The security check kernel performs check calculation by using the key and the first boot program file, to obtain a second check result.

B3: The security check kernel determines, based on the first check result and the second check result, whether the first boot program file is successfully checked.

A check process of the security check kernel in step B1 to step B3 is similar to the descriptions of step A1 to step A3 in the foregoing embodiment. For details, refer to the detailed descriptions of step A1 to step A3.

It should be noted that, that the security check kernel performs check calculation by using a key and the boot program source file in the memory, to obtain a first check result may be generating the first check result each time the first boot program file needs to be checked, or may be pre-calculating the first check result, storing the first check result in a flash, and reading the first check result from the flash each time the first boot program file needs to be checked. A manner of obtaining the first check result is not limited herein.

In some embodiments of this application, the controller further includes a memory, the security check kernel is connected to the memory, and the memory pre-stores a boot program source file.

The method provided in this embodiment of this application further includes the following steps.

C1: The security check kernel writes the boot program source file to the BIOS file storage apparatus when the first boot program file fails to be checked.

C2: The security check kernel checks the boot program source file written to the BIOS file storage apparatus.

A check process of the security check kernel in step C1 and step C2 is similar to the descriptions of step 304 and step 305 in the foregoing embodiment. For details, refer to the detailed descriptions of step 304 and step 305.

C3: The security check kernel sends a first instruction to the control switch through the enable control pin when the boot program source file written to the BIOS file storage apparatus is successfully checked.

C4: The control switch receives the first instruction through the enable control pin, and connects the second channel to the third channel according to the first instruction, so that a connection between the BIOS file storage apparatus and the computer hardware system is successfully established when the second channel is connected to the third channel, and therefore the computer hardware system completes power-on and running by using the first boot program file.

A check process of the security check kernel in step C3 and step C4 is similar to the descriptions of step 603 and step 604 in the foregoing embodiment. For details, refer to the detailed descriptions of step 603 and step 604.

In some embodiments of this application, the method provided in this embodiment of this application further includes the following step:

When the first boot program file fails to be checked, the security check kernel deletes the first boot program file stored in the BIOS file storage apparatus.

When the first boot program file fails to be checked, it indicates that the first boot program file stored in the BIOS file storage apparatus may be tampered with or damaged, that is, the first boot program file stored in the BIOS file storage apparatus is untrustworthy. The controller may further delete the first boot program file stored in the BIOS file storage apparatus, that is, the controller may erase the tampered first boot program file in the BIOS file storage apparatus, so that a flash in the controller may be configured to re-write an untampered boot program source file, to improve space usage efficiency of the flash.

In some embodiments of this application, the BIOS file storage apparatus includes a primary BIOS file storage module and a secondary BIOS file storage module. The control switch is connected to the primary BIOS file storage module through a first subchannel, the control switch is connected to the secondary BIOS file storage module through a second subchannel, and both the primary BIOS file storage module and the secondary BIOS file storage module pre-store the first boot program file.

It can be learned from FIG. 5*a* and FIG. 5*b* that the control switch is connected to the BIOS file storage apparatus through the third channel. The BIOS file storage apparatus includes a primary BIOS file storage module and a secondary BIOS file storage module, and the third channel may include a first subchannel and a second subchannel. Specifically, the first subchannel connects the control switch to the primary BIOS file storage module, and the second subchannel connects the control switch to the secondary BIOS file storage module. The first subchannel and the second subchannel are not schematically described in FIG. 5*a* and FIG. 5*b*. This is merely a possible example of this embodiment of this application.

The method provided in this embodiment of this application further includes the following steps.

D1: The secure boot kernel obtains the first boot program file in the primary BIOS file storage module through the first channel and the first subchannel.

D2: The secure boot kernel checks the first boot program file in the primary BIOS file storage module.

In this embodiment of this application, the security check kernel determines, based on a check result of the first boot program file, whether to perform steps D3 and D4. The security check kernel may perform steps D3 and D4 when the first boot program file is successfully checked. The controller performs step D5 to step D8 when the first boot program file fails to be checked.

D3: The security check kernel sends a first instruction to the control switch through an enable control pin when the first boot program file is successfully checked.

D4: The control switch connects the second channel to the first subchannel according to the first instruction, so that a connection between the primary BIOS file storage module and the computer hardware system is successfully established when the second channel is connected to the first subchannel.

A check process of the security check kernel in step D1 to step D4 is similar to the descriptions of step 601 to step 604 in the foregoing embodiment. For details, refer to the detailed descriptions of step 601 to step 604.

D5: The secure boot kernel obtains the first boot program file in the secondary BIOS file storage module through the first channel and the second subchannel when the first boot program file in the primary BIOS file storage module fails to be checked.

D6: The secure boot kernel checks the first boot program file in the secondary BIOS file storage module.

D7: The security check kernel sends a second instruction to the control switch through the enable control pin when the first boot program file in the secondary BIOS file storage module is successfully checked.

D8: The control switch receives the second instruction through the enable control pin, and then the control switch connects the second channel to the second subchannel according to the second instruction, so that a connection between the secondary BIOS file storage module and the computer hardware system is successfully established when the second channel is connected to the second subchannel, and therefore the computer hardware system completes power-on and running by using the first boot program file.

A check process of the security check kernel in step D5 to step D8 is similar to the descriptions of step 404 to step 406 in the foregoing embodiment. For details, refer to the detailed descriptions of step 404 to step 406.

In some embodiments of this application, the controller further includes a memory, the security check kernel is connected to the memory, and the memory pre-stores a boot program source file.

The method provided in this embodiment of this application further includes the following steps:

E1: The secure boot kernel writes the boot program source file to the primary BIOS file storage module when the first boot program file in the secondary BIOS file storage module fails to be checked.

E2: The secure boot kernel checks the boot program source file written to the primary BIOS file storage module.

E3: The security check kernel sends a first instruction to the control switch through the enable control pin when the boot program source file written to the primary BIOS file storage module is successfully checked.

E4: The control switch receives the first instruction through the enable control pin, and then the control switch connects the second channel to the first subchannel according to the first instruction, so that a connection between the primary BIOS file storage module and the computer hardware system is successfully established when the second channel is connected to the first subchannel, and therefore the computer hardware system completes power-on and running by using the first boot program file.

A check process of the security check kernel in step E1 to step E4 is similar to the descriptions of step 407 to step 409 in the foregoing embodiment. For details, refer to the detailed descriptions of step 407 to step 409.

In some embodiments of this application, the controller further includes a memory, the security check kernel is connected to the memory, and the memory pre-stores a boot program source file.

The method provided in this embodiment of this application further includes the following step:

The secure boot kernel writes the boot program source file to the secondary BIOS file storage module when the first boot program file in the secondary BIOS file storage module fails to be checked.

When the first boot program file fails to be checked, it indicates that the first boot program file stored in the secondary BIOS file storage module may be tampered with or damaged, that is, the first boot program file stored in the secondary BIOS file storage module is untrustworthy. The security check kernel may pre-store the boot program source file, where the boot program source file is an original file used to boot the computer hardware system, and the boot program source file may be pre-stored in the security check kernel after being encrypted. For example, the security check kernel may include a flash, and the flash may also be referred to as a flash storage security check kernel. The flash may be configured to store the boot program source file, so that the security check kernel performs check by using the boot program source file.

It can be learned from the descriptions of the example of the foregoing embodiment that the controller includes the security check kernel, and the security check kernel communicates with the control switch through the enable control pin of the control switch. The control switch is connected to the security check kernel through the first channel, the control switch is connected to the computer hardware system through the second channel, and the control switch is connected to the BIOS file storage apparatus through the third channel. The security check kernel first obtains the first boot program file in the BIOS file storage apparatus through the first channel and the third channel, where the first boot program file is the BIOS file pre-stored in the BIOS file storage apparatus, then the security check kernel checks the first boot program file, and the security check kernel sends the first instruction to the control switch through the enable control pin when the first boot program file is successfully checked. The control switch receives the first instruction through the enable control pin, and then the control switch connects the second channel to the third channel according to the first instruction, so that the connection between the BIOS file storage apparatus and the computer hardware system is successfully established when the second channel is connected to the third channel, and therefore the computer hardware system completes power-on and running by using the first boot program file. In this embodiment of this application, the security check kernel may check the first boot program file in the BIOS file storage apparatus, and the control switch establishes the connection between the BIOS file storage apparatus and the computer hardware system only when the first boot program file is successfully checked. In this case, the computer hardware system can read the first boot program file in the BIOS file storage apparatus to complete power-on and running. In this embodiment of this application, the security check kernel may check the first boot program file pre-stored in the BIOS file storage apparatus, to ensure that the first boot program file is secure, that is, to ensure that the first boot program file is not tampered with, so as to improve a boot security level of the computer hardware system, and avoid a security risk caused by using a tampered boot program file.

To better understand and implement the foregoing solutions in the embodiments of this application, the following uses a corresponding application scenario as an example for specific description.

In this embodiment of this application, an x86 system may be securely booted and enter an operating system, so as to ensure security and trustworthiness of a BIOS program file, and avoid data leakage caused when the BIOS program file is tampered with.

Figure 7:
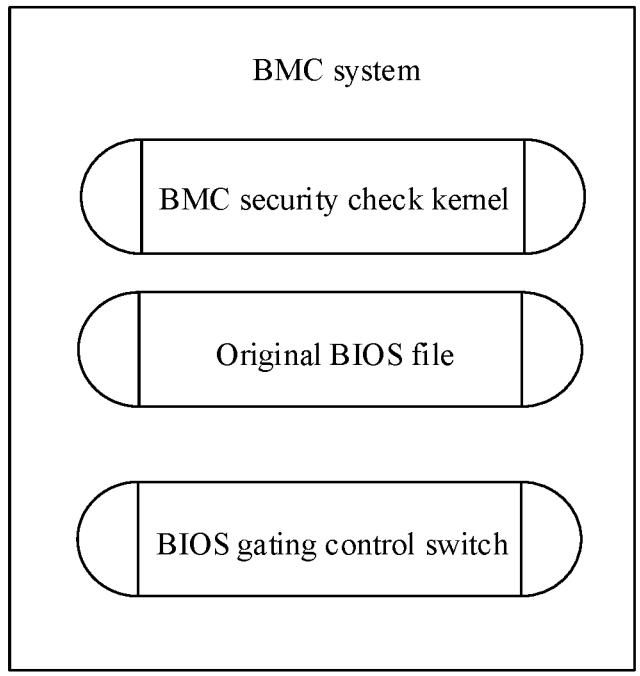
FIG. 7 is a schematic diagram of a composition structure of a BMC system according to an embodiment of this application.

As shown in FIG. 7, the controller provided in this embodiment of this application may be a BMC system. The BMC system includes a BMC security check kernel, a BIOS original file, and a BIOS gating control switch (briefly referred to as a control switch below). The BMC system is a BMC out-of-band management system based on a trusted algorithm. In this embodiment of this application, the BMC out-of-band management system is an out-of-band management system attached to a computer. In this embodiment of this application, the BMC out-of-band management system has a function of performing file integrity check before power-on by the BMC security check kernel on a BIOS, and may also have a function of performing write-back and recovery on a damaged BIOS program file.

The BMC system mainly includes a BMC chip. The BMC chip includes two parts: a security check kernel based on a trusted algorithm and a flash memory controller. For example, the memory controller pre-stores an original BIOS file of an x86 system. A group of keys is obtained after a specific encryption algorithm is performed on the file by using the BMC security check kernel, and the key is bound to the original BIOS file. If the key does not match a key in an external system, the external system cannot erase the original BIOS file stored in the BMC. The original BIOS file may also be referred to as BIOS program data, a BIOS program, a BIOS source file, or the like. The external system refers to a computer of a user or an external third party, and the external system needs to be connected to a local computer through some external interfaces or the like. In this embodiment of this application, before the x86 system is booted, security check is performed on the original x86 BIOS file by using the BMC system, to ensure that the BIOS program data is not tampered with, and the x86 system is securely booted and enters an operating system, so as to ensure that key data of the user is secure and trustworthy and is not attacked and leaked.

Figure 8:
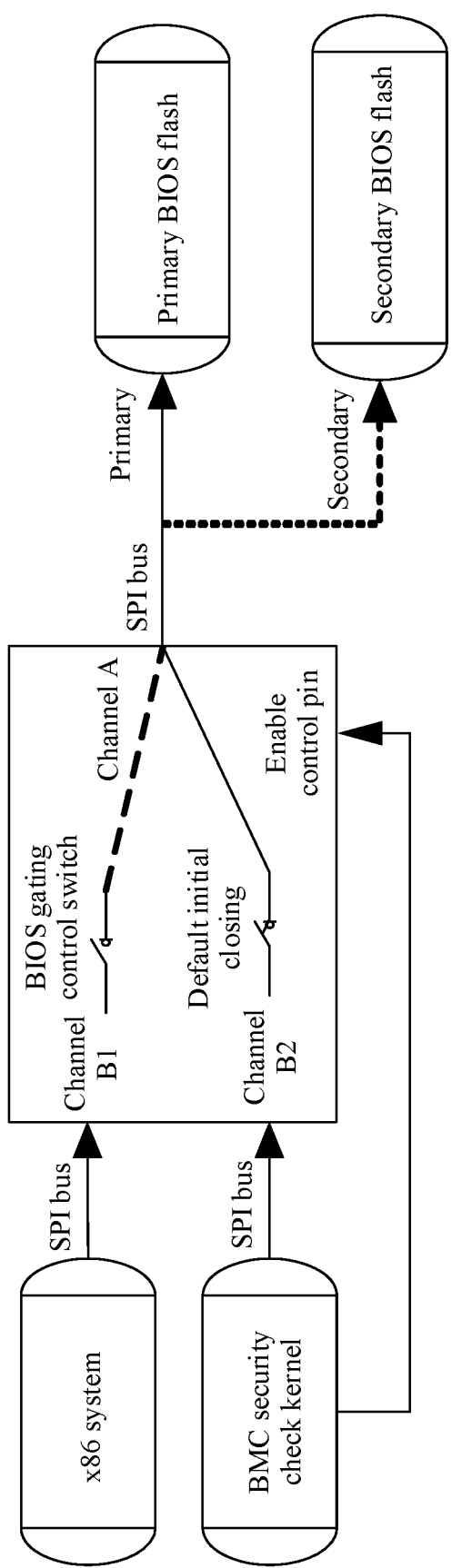
FIG. 8 is a schematic composition diagram of internal hardware of a computer boot system according to an embodiment of this application.

An x86 system is used as an example. FIG. 8 is a schematic composition diagram of internal hardware of a computer boot system according to an embodiment of this application. The computer boot system may include an x86 system, a BMC system, a primary BIOS flash, and a secondary BIOS flash. In some embodiments of this application, a control switch may belong to the BMC system, that is, the BMC system may include a BMC security check kernel and the control switch. It is not limited that the control switch may alternatively be a logical switch independent of the BMC system. In FIG. 8, an example in which the control switch belongs to the BMC system is used for description.

In FIG. 8, the x86 system is connected to a channel B1 in the control switch through an SPI bus, the BMC security check kernel is connected to a channel B2 in the control switch through an SPI bus, and the control switch is initially connected to the BMC security check kernel by default. The BMC security check kernel controls a closed/opened state of the switch through an enable control pin in the control switch. The control switch is separately connected to the primary BIOS flash and the secondary BIOS flash through an SPI bus.

In this embodiment of this application, before the x86 system is powered on, the BMC controls, through the control switch, the BIOS to be connected to the BMC system. In an initial state of the switch, the channel B2 is connected by default, and primary and secondary BIOSs are respectively connected to the BMC and the x86 system through the switch. Then, after determining that BIOS data is secure and complete, the BMC security check kernel transfers control of the gating switch to the x86 system (that is, the switch switches to the channel B1). In this way, the BIOS flash chip is connected to the x86 system and the x86 system is booted to be securely powered on.

It should be noted that this embodiment of this application is also applicable to a single-BIOS scenario. In the single-BIOS scenario, once the BIOS data is tampered with, a complete BIOS source file needs to be written back, and the x86 system can be booted only after the BIOS file is recovered. In the following embodiment, primary-secondary dual BIOS hardware is used as an example for description. In this way, the x86 system can be booted to be powered on, and when an exception occurs, the primary and secondary BIOSs can be erased, written back, and recovered.

The BMC chip needs to provide a security check kernel. The security check kernel provides an accurate security algorithm to ensure data security and accuracy. It can be ensured that program files of the primary and secondary BIOSs are determined to be secure and not to be tampered with, so that a computer of a user has a high boot security level, and data is not tampered with. The BMC chip can provide at least a large enough flash for storing a BIOS source file to ensure that an original BIOS file in the x86 system can be stored. It can be ensured that after determining, through check, that data of the primary and secondary BIOSs is tampered with, the security check kernel can read a complete BIOS source file from the BMC and write back the complete BIOS source file to the primary and secondary BIOS flashes, to ensure that the system is securely powered on.

Figure 9:
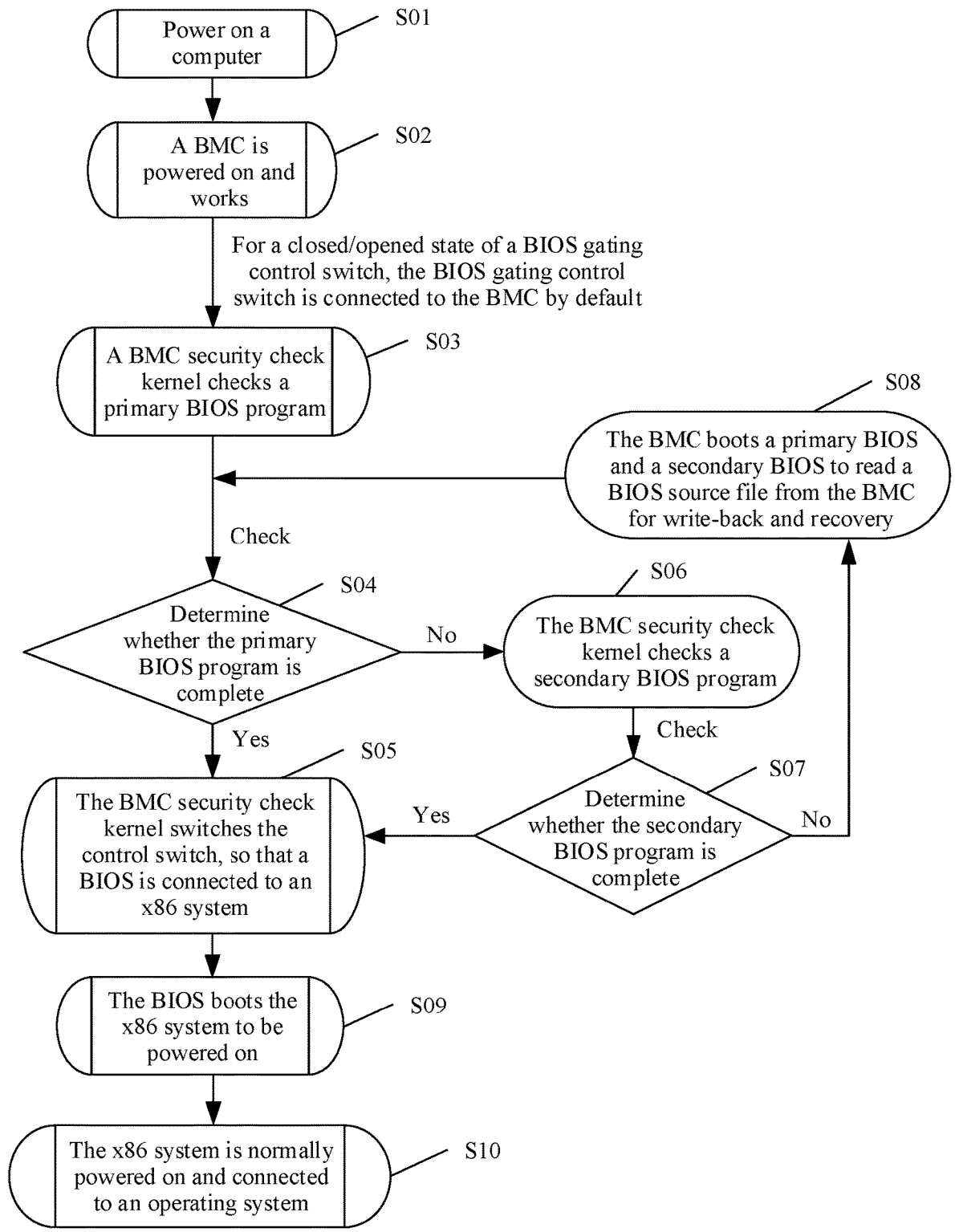
FIG. 9 is a schematic flowchart of performing a computer boot method according to an embodiment of this application.

FIG. 9 is a schematic flowchart of performing a computer boot method according to an embodiment of this application. The method mainly includes the following procedure.

S01: Power on a computer.

The computer may be a server. For example, 220 volts of alternating current may be provided to the computer.

S02: A BMC is powered on and works.

The BMC refers to the foregoing BMC system. For a closed/opened state of a BIOS gating control switch, the BIOS gating control switch is connected to the BMC by default.

S03: A BMC security check kernel checks a primary BIOS program.

S04: The BMC determines whether the primary BIOS program is complete.

S05: When the primary BIOS program is complete, the BMC security check kernel switches the control switch, so that a BIOS is connected to an x86 system, and then performs step S09.

Figure 10A:
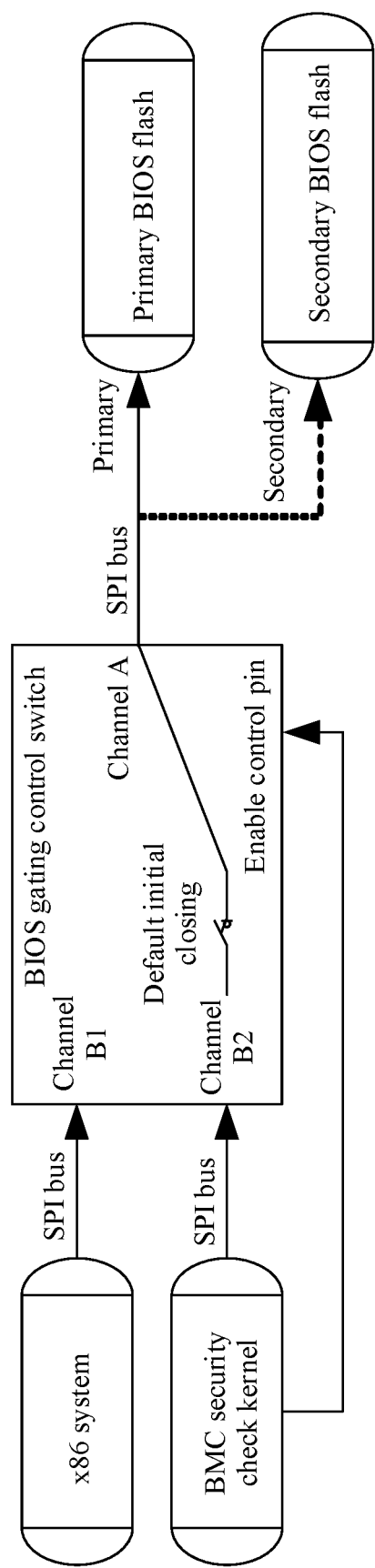
FIG. 10a is a schematic diagram of default initial closing of a BIOS gating control switch according to an embodiment of this application.

FIG. 10a is a schematic diagram of default initial closing of a BIOS gating control switch according to an embodiment of this application. A primary BIOS flash is connected to the BMC and the x86 system through an SPI bus and a control switch, and a secondary BIOS flash is connected to the BMC and the x86 system through the SPI bus and the control switch. After a computer is powered on, hardware control first supplies power to the BMC system, and power-on is completed after the BMC system is booted. In an initial state, the BMC controls the switch to be closed, so that the BMC is connected to the primary BIOS flash through the SPI bus, and a switchover right of the switch is controlled by the BMC security check kernel. The BMC security check kernel is a kernel of a processor of a chip in the BMC, is implemented by a hardware logic circuit, and may be configured to check a BIOS program file. In this case, the x86 system cannot be directly connected to the BIOS flash. Before the control switch is closed, the x86 system cannot perform power-on configuration and self-check. In this case, the x86 system cannot be normally booted.

Figure 10B:
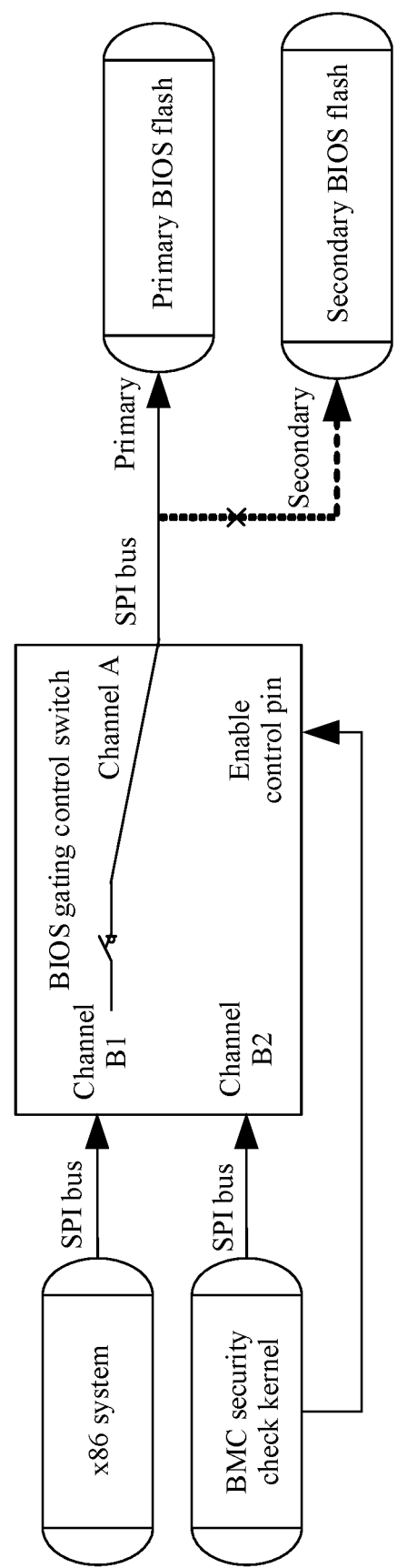
FIG. 10b is a schematic diagram in which an x86 system is connected to a primary BIOS according to an embodiment of this application.

FIG. 10b is a schematic diagram in which an x86 system is connected to a primary BIOS according to an embodiment of this application. A BMC security check kernel inside a BMC chip invokes a pre-stored original BIOS file, and a BMC performs data security check on a primary BIOS program through an SPI bus connected to a BIOS. If it is checked that the primary BIOS program is the same as preset BMC data, it indicates that the primary BIOS program is not tampered with. The preset BMC data is stored in a flash memory controller inside the BMC chip. In this case, the BMC security check kernel switches a control switch in the BIOS to connect the BIOS to the x86 system. The channel B2 is connected by default. If the check succeeds, the control switch is switched to the channel B1. The x86 system imports boot-related program data from the primary BIOS flash, so that a power-on initialization action is completed, and the x86 system is booted to enter an operating system.

It should be noted that, a group of keys is obtained after a specific encryption algorithm is performed on a source file on the flash memory controller inside the BMC chip in advance by using the BMC security check kernel, and the key is bound to the original BIOS file. If the key does not match a key in an external system, the external system cannot erase the original BIOS file stored in the BMC.

In this embodiment of this application, a check process performed by the BMC security check kernel is as follows: The key is stored in the flash memory controller inside the BMC chip. The original BMC file may be stored in the BMC after being encrypted. During check, data in original BMC files stored at different locations may be compared by using a same key. If the data is completely the same, it is considered that files stored in the BIOS and BMC are the same.

S06: When the primary BIOS program is incomplete, the BMC security check kernel checks a secondary BIOS program.

S07: The BMC security check kernel determines whether the secondary BIOS program is complete.

S08: When the secondary BIOS program is incomplete, the BMC security check kernel boots the primary BIOS flash and the secondary BIOS flash to separately read a BIOS source file from the BMC for write-back and recovery.

S09: The BIOS boots the x86 system to be powered on.

S10: The x86 system is normally powered on and connected to an operating system.

Figure 10C:
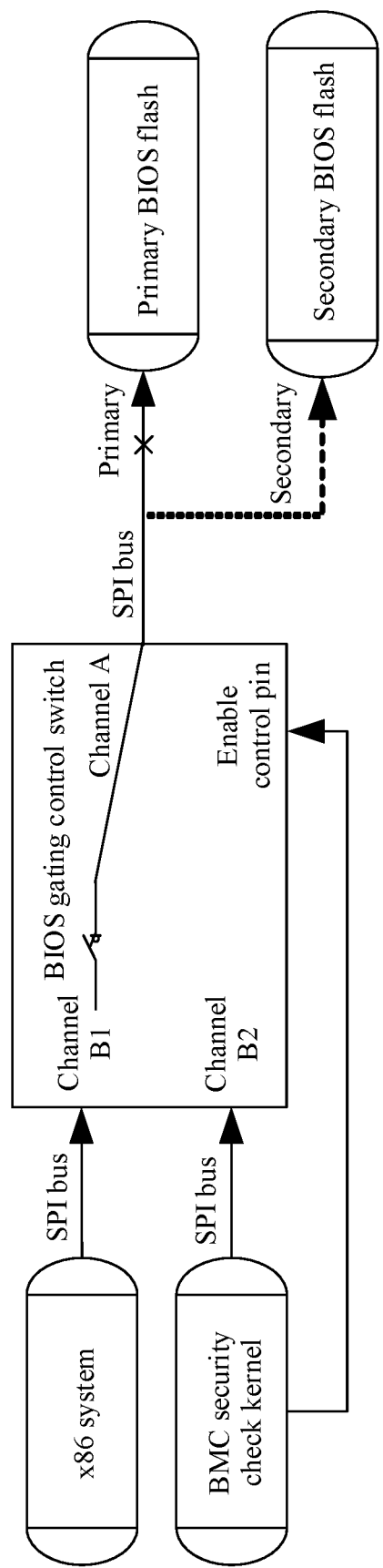
FIG. 10c is a schematic diagram in which an x86 system is connected to a secondary BIOS according to an embodiment of this application.

FIG. 10c is a schematic diagram in which an x86 system is connected to a secondary BIOS according to an embodiment of this application. If the BMC security check kernel checks that a primary BIOS program is different from preset BMC data, it indicates that the primary BIOS data is tampered with. In this case, the BMC security check kernel starts security check on secondary BIOS program data. If the BMC security check kernel checks that the secondary BIOS program is the same as preset BMC data, it indicates that the secondary BIOS data is not tampered with. In this case, the BMC security check kernel switches a control switch in the secondary BIOS to connect the BIOS to the x86 system. The x86 system can import boot-related program data from the secondary BIOS, so that a power-on initialization action is completed, and the x86 system is booted to enter an operating system.

Figure 10D:
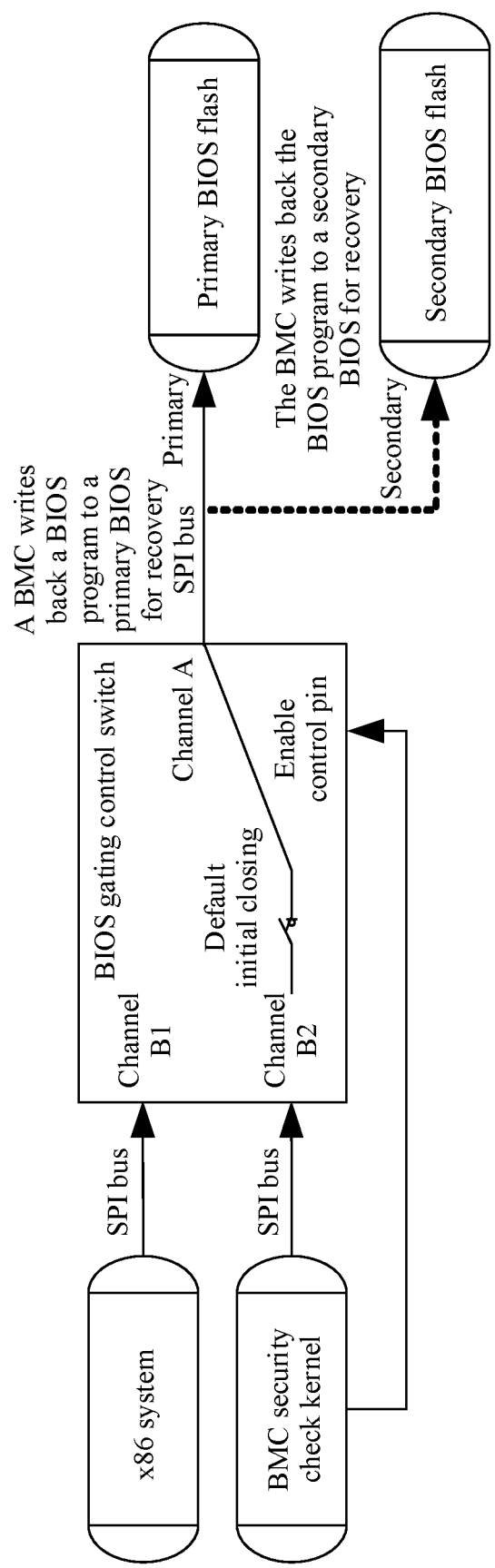
FIG. 10d is a schematic diagram in which a BMC writes back a BIOS source file to a primary BIOS and a secondary BIOS according to an embodiment of this application.

FIG. 10*d* is a schematic diagram in which a BMC writes back a BIOS source file to a primary BIOS flash and a secondary BIOS flash according to an embodiment of this application. If the BMC security check kernel checks that neither of a primary BIOS program and a secondary BIOS program is different from preset BMC data, it indicates that both the primary BIOS program and the secondary BIOS program are tampered with. In this case, the BMC is booted to first erase all tampered programs from the primary BIOS flash and the secondary BIOS flash, and then the BMC security check kernel performs an operation on the primary BIOS flash and the secondary BIOS flash, reads a pre-stored original BIOS file, and writes back the pre-stored original BIOS file to the primary BIOS flash and the secondary BIOS flash. After write-back is completed, the BMC security check kernel performs security check on the primary BIOS program. If the BMC security check kernel checks that the primary BIOS program is the same as the preset BMC data, it indicates that the primary BIOS program is written back completely. In this case, the BMC security check kernel switches a control switch in the BIOS to connect the primary BIOS flash to the x86 system. The x86 system imports boot-related program data from the primary BIOS flash, so that a power-on initialization action is completed, and the x86 system is booted to enter an operating system.

It can be learned from the descriptions of the foregoing examples that, an embodiment of this application provides an x86-based trusted boot solution. Before the x86 system is booted, security check is performed on the original BIOS file in the x86 system by using the BMC system, to ensure that the BIOS program data is not tampered with, and the x86 system is securely booted and enters the OS, so as to ensure that key data of a customer is secure and trustworthy and is not attacked and leaked when the computer is booted and after the computer enters the OS.

It should be noted that for ease of brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that the embodiments described in this specification all are preferred embodiments, and the actions and modules are not necessarily required by this application.

To better implement the foregoing solutions in the embodiments of this application, the following further provides related apparatuses for implementing the foregoing solutions.

Figure 11:
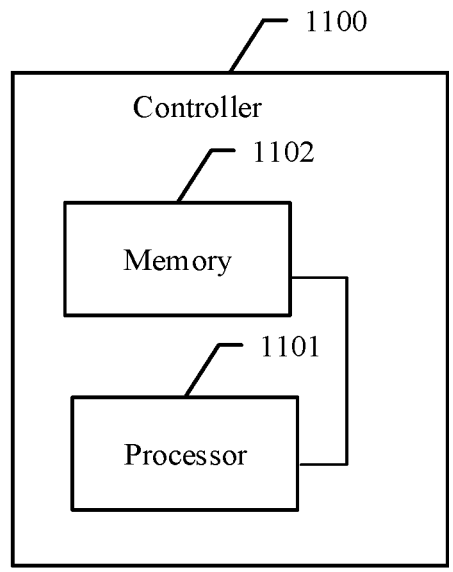
FIG. 11 is a schematic diagram of a composition structure of a controller according to an embodiment of this application.

FIG. 11 shows a controller 1100 according to an embodiment of this application. The controller 1100 may include a processor 1101 and a memory 1102.

The processor and the memory communicate with each other.

The memory is configured to store instructions.

The processor is configured to execute the instructions in the memory, to perform the method according to any one of the foregoing embodiments in FIG. 2 to FIG. 4.

In some embodiments of this application, the processor and the memory may be connected through a bus or in another manner.

The memory may include a read-only memory and a random access memory, and provide an instruction and data for the processor. A part of the memory may further include a non-volatile random access memory (NVRAM). The memory stores an operating system and an operation instruction, an executable module or a data structure, a subset thereof, or an extended set thereof. The operation instruction may include various operation instructions to implement various operations. The operating system may include various system programs, to implement various basic services and process hardware-based tasks.

The processor may also be referred to as a central processing unit (CPU). In specific application, all components of the controller are coupled together by using a bus system. In addition to a data bus, the bus system may further include a power bus, a control bus, a status signal bus, and the like. However, for clear description, various buses in the figure are referred to as the bus system.

The methods disclosed in the foregoing embodiments of this application may be applied to the processor or may be implemented by the processor. The processor may be an integrated circuit chip and has a signal processing capability. In embodiments of an implementation process, steps in the foregoing methods may be implemented by using a hardware integrated logic circuit in the processor, or by using instructions in a form of software. The processor may be a general-purpose processor, a digital signal processor (DSP), an application-specific integrated circuit (ASIC), a field-programmable gate array (FPGA) or another programmable logic device, a discrete gate or a transistor logic device, or a discrete hardware component. The processor may implement or perform the methods, steps, and logical block diagrams that are disclosed in the embodiments of this application. The general-purpose processor may be a microprocessor, or the processor may be any conventional processor, or the like. The steps in the methods disclosed with reference to the embodiments of this application may be directly performed and completed by a hardware decoding processor, or may be performed and completed by using a combination of hardware and software modules in the decoding processor. The software module may be located in a mature storage medium in the art, such as a random access memory, a flash, a read-only memory, a programmable read-only memory, an electrically erasable programmable memory, or a register. The storage medium is located in the memory, and the processor reads information in the memory and completes the steps in the foregoing methods in combination with hardware of the processor.

Figure 12:
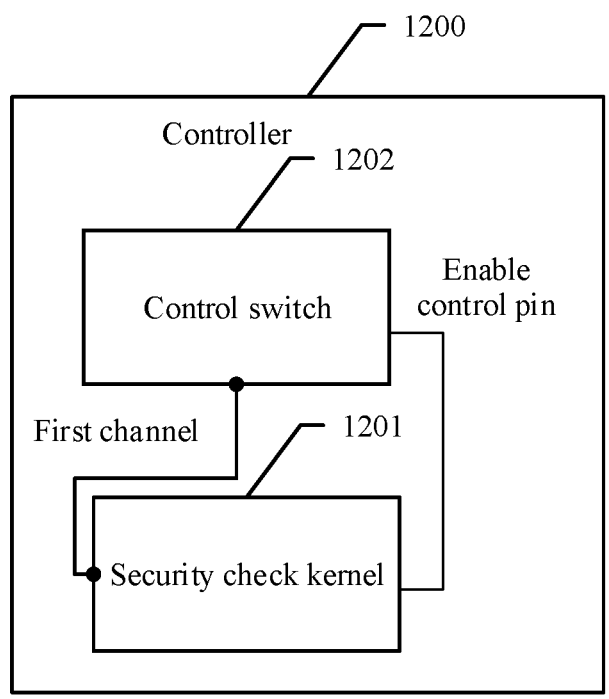
FIG. 12 is a schematic diagram of a composition structure of another controller according to an embodiment of this application.

FIG. 12 shows a controller 1200 according to an embodiment of this application. The controller 1200 may include a security check kernel 1201.

The security check kernel communicates with a control switch through an enable control pin of the control switch.

The control switch is connected to the security check kernel through a first channel, the control switch is connected to a computer hardware system through a second channel, and the control switch is connected to a BIOS file storage apparatus through a third channel.

The security check kernel is configured to: obtain a first boot program file in the BIOS file storage apparatus through the first channel and the third channel, where the first boot program file is a BIOS file pre-stored in the BIOS file storage apparatus; check the first boot program file; and send a first instruction to the control switch through the enable control pin when the first boot program file is successfully checked.

The control switch is configured to: receive the first instruction through the enable control pin, and then connect the second channel to the third channel according to the first instruction, so that a connection between the BIOS file storage apparatus and the computer hardware system is successfully established when the second channel is connected to the third channel, and therefore the computer hardware system completes power-on and running by using the first boot program file.

In some embodiments of this application, a control switch 1202 may belong to the controller 1200, that is, the controller 1200 includes the security check kernel 1201 and the control switch 1202. It is not limited that the controller may alternatively be a logical switch independent of the controller.

In some embodiments of this application, the controller further includes a memory, the security check kernel is connected to the memory, and the memory pre-stores a boot program source file.

The security check kernel is further configured to: perform check calculation by using a key and the boot program source file in the memory, to obtain a first check result; perform check calculation by using the key and the first boot program file, to obtain a second check result; and determine, based on the first check result and the second check result, whether the first boot program file is successfully checked.

In some embodiments of this application, the controller further includes a memory, the security check kernel is connected to the memory, and the memory pre-stores a boot program source file.

The security check kernel is further configured to: write the boot program source file to the BIOS file storage apparatus when the first boot program file fails to be checked; check the boot program source file written to the BIOS file storage apparatus; and send the first instruction to the control switch through the enable control pin when the boot program source file written to the BIOS file storage apparatus is successfully checked.

The control switch is further configured to: receive the first instruction through the enable control pin, and connect the second channel to the third channel according to the first instruction, so that the connection between the BIOS file storage apparatus and the computer hardware system is successfully established when the second channel is connected to the third channel, and therefore the computer hardware system completes power-on and running by using the first boot program file.

In some embodiments of this application, the security check kernel is further configured to: when the first boot program file fails to be checked, delete the first boot program file stored in the BIOS file storage apparatus.

In some embodiments of this application, the BIOS file storage apparatus includes a primary BIOS file storage module and a secondary BIOS file storage module, the control switch is connected to the primary BIOS file storage module through a first subchannel, the control switch is connected to the secondary BIOS file storage module through a second subchannel, and both the primary BIOS file storage module and the secondary BIOS file storage module pre-store the first boot program file.

The security check kernel is further configured to: obtain the first boot program file in the primary BIOS file storage module through the first channel and the first subchannel; and check the first boot program file in the primary BIOS file storage module.

The control switch is further configured to connect the second channel to the first subchannel according to the first instruction, so that a connection between the primary BIOS file storage module and the computer hardware system is successfully established when the second channel is connected to the first subchannel.

In some embodiments of this application, the secure boot kernel is further configured to: obtain the first boot program file in the secondary BIOS file storage module through the first channel and the second subchannel when the first boot program file in the primary BIOS file storage module fails to be checked; check the first boot program file in the secondary BIOS file storage module; and send a second instruction to the control switch through the enable control pin when the first boot program file in the secondary BIOS file storage module is successfully checked.

The control switch is further configured to: receive the second instruction through the enable control pin, and connect the second channel to the second subchannel according to the second instruction, so that a connection between the secondary BIOS file storage module and the computer hardware system is successfully established when the second channel is connected to the second subchannel, and therefore the computer hardware system completes power-on and running by using the first boot program file in the secondary BIOS file storage module.

In some embodiments of this application, the controller further includes a memory, the security check kernel is connected to the memory, and the memory pre-stores a boot program source file.

The secure boot kernel is further configured to: write the boot program source file to the primary BIOS file storage module when the first boot program file in the secondary BIOS file storage module fails to be checked; check the boot program source file written to the primary BIOS file storage module; and send the first instruction to the control switch through the enable control pin when the boot program source file written to the primary BIOS file storage module is successfully checked.

The control switch is further configured to: receive the first instruction through the enable control pin, and connect the second channel to the first subchannel according to the first instruction, so that the connection between the primary BIOS file storage module and the computer hardware system is successfully established when the second channel is connected to the first subchannel, and therefore the computer hardware system completes power-on and running by using the boot program source file written to the primary BIOS file storage module.

In some embodiments of this application, the controller further includes a memory, the security check kernel is connected to the memory, and the memory pre-stores a boot program source file.

The secure boot kernel is further configured to write the boot program source file to the secondary BIOS file storage module when the first boot program file in the secondary BIOS file storage module fails to be checked.

In some embodiments of this application, the controller is a baseboard management controller BMC, and the BIOS file storage apparatus is a flash storing a BIOS file.

The first channel is a first serial peripheral interface SPI bus, the second channel is a second SPI bus, and the third channel is a third SPI bus.

It should be noted that content such as information exchange between the modules/units of the apparatus and the execution processes thereof is based on a same concept as the method embodiments of this application, and achieves same technical effects as the method embodiments of this application. For specific content, refer to the foregoing descriptions in the method embodiments of this application. Details are not described herein again.

An embodiment of this application further provides a computer storage medium. The computer storage medium stores a program. The program is executed to perform some or all of the steps described in the method embodiments.

In another possible design, when the controller is a chip, the chip includes a processing unit and a communications unit. The processing unit may be, for example, a processor. The communications unit may be, for example, an input/output interface, a pin, or a circuit. The processing unit may execute computer executable instructions stored in a storage unit, so that the chip in the terminal performs the foregoing computer boot method. Optionally, the storage unit is a storage unit in the chip, such as a register or a buffer, or the storage unit may be a storage unit in the terminal but outside the chip, such as a read-only memory (ROM), another type of static storage device that can store static information and instructions, or a random access memory (RAM).

The processor mentioned above may be a general-purpose central processing unit, a microprocessor, an ASIC, or one or more integrated circuits for controlling program execution of the foregoing computer boot method.

In addition, it should be noted that the described apparatus embodiments are merely examples. The units described as separate parts may or may not be physically separate, and parts displayed as units may or may not be physical units, and may be located in one position, or may be distributed on a plurality of network units. Some or all the modules may be selected based on an actual requirement to achieve the objectives of the solutions of the embodiments. In addition, in the accompanying drawings of the apparatus embodiments provided in this application, connection relationships between modules indicate that the modules have communication connections with each other, and may be specifically implemented as one or more communications buses or signal cables.

Based on the descriptions of the foregoing embodiments and implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any function that can be performed by a computer program can be easily implemented by corresponding hardware. Moreover, a specific hardware structure used to achieve a same function may be of various forms, for example, in a form of an analog circuit, a digital circuit, a dedicated circuit, or the like. However, as for embodiments of this application discussed herein, software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a server, a network device, or the like) to perform the methods described in the embodiments of this application.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A computer boot method, wherein the method is applied to a controller comprising a security check kernel communicatively coupled to a control switch, the controller is separately connected to a computer hardware system and a basic input/output system (BIOS) file storage apparatus, the control switch has an initial state and an actuated state, the initial state with the security check kernel connected to the BIOS file storage apparatus and the computer hardware system disconnected from the BIOS file storage apparatus and the actuated state with the security check kernel disconnected from the BIOS file storage apparatus and the computer hardware system connected to the BIOS file storage apparatus, and the method comprises:
    obtaining, by the controller, a first boot program file that is a BIOS file pre-stored in the BIOS file storage apparatus when the controller is powered on and runs with the control switch in the initial state such that the computer hardware system is disconnected from the BIOS file storage apparatus;
    checking, by the controller, the first boot program file; and
    establishing, by the controller changing the control switch from the initial state to the actuated state, a connection between the BIOS file storage apparatus and the computer hardware system when the first boot program file is successfully checked, the computer hardware system completes power-on and running using the first boot program file when the connection between the BIOS file storage apparatus and the computer hardware system is successfully established.

2. The method according to claim 1, wherein the checking, by the controller, the first boot program file comprises:
    performing, by the controller, check calculation using a key and a boot program source file that is a BIOS file pre-stored in the controller, to obtain a first check result;
    performing, by the controller, check calculation using the key and the first boot program file, to obtain a second check result; and
    determining, by the controller based on the first check result and the second check result, whether the first boot program file is successfully checked.

3. The method according to claim 1, wherein the method further comprises:
    writing, by the controller, a boot program source file to the BIOS file storage apparatus when the first boot program file fails to be checked, wherein the boot program source file is a BIOS file pre-stored in the controller;

checking, by the controller, the boot program source file written to the BIOS file storage apparatus; and establishing, by the controller changing the control switch from the initial state to the actuated state, a connection between the BIOS file storage apparatus and the computer hardware system when the boot program source file written to the BIOS file storage apparatus is successfully checked, the computer hardware system completes power-on and running using the boot program source file written to the BIOS file storage apparatus when the connection between the BIOS file storage apparatus and the computer hardware system is successfully established.

4. The method according to claim 3, wherein the method further comprises:

deleting, by the controller, the first boot program file stored in the BIOS file storage apparatus.

5. The method according to claim 1, wherein the BIOS file storage apparatus comprises a primary BIOS file storage and a secondary BIOS file storage, the controller is separately connected to the primary BIOS file storage and the secondary BIOS file storage, and both the primary BIOS file storage and the secondary BIOS file storage pre-store the first boot program file;

the obtaining, by the controller, the first boot program file in the BIOS file storage apparatus comprises:

obtaining, by the controller, the first boot program file in the primary BIOS file storage;

the checking, by the controller, the first boot program file comprises:

checking, by the controller, the first boot program file in the primary BIOS file storage; and the establishing, by the controller changing the control switch from the initial state to the actuated state, the connection between the BIOS file storage apparatus and the computer hardware system when the first boot program file is successfully checked comprises:

establishing, by the controller changing the control switch from the initial state to the actuated state, a connection between the primary BIOS file storage and the computer hardware system when the first boot program file in the primary BIOS file storage is successfully checked.

6. The method according to claim 5, wherein the method further comprises:

obtaining, by the controller, the first boot program file in the secondary BIOS file storage when the first boot program file in the primary BIOS file storage fails to be checked;

checking, by the controller, the first boot program file in the secondary BIOS file storage; and establishing, by the controller changing the control switch from the initial state to the actuated state, a connection between the secondary BIOS file storage and the computer hardware system when the first boot program file in the secondary BIOS file storage is successfully checked.

7. The method according to claim 6, wherein the method further comprises:

writing, by the controller, a boot program source file to the primary BIOS file storage when the first boot program file in the secondary BIOS file storage fails to be checked, wherein the boot program source file is a BIOS file pre-stored in the controller;

checking, by the controller, the boot program source file written to the primary BIOS file storage; and establishing, by the controller changing the control switch from the initial state to the actuated state, a connection between the primary BIOS file storage and the computer hardware system when the boot program source file written to the primary BIOS file storage is successfully checked, the computer hardware system completes power-on and running using the boot program source file written to the primary BIOS file storage when the connection between the primary BIOS file storage and the computer hardware system is successfully established.

8. The method according to claim 6, wherein the method further comprises:

writing, by the controller, a boot program source file to the secondary BIOS file storage when the first boot program file in the secondary BIOS file storage fails to be checked, wherein the boot program source file is a BIOS file pre-stored in the controller.

9. The method according to claim 1, wherein the controller is a baseboard management controller (BMC), and the BIOS file storage apparatus is a flash storage storing a BIOS file; and the BMC is connected, through a first serial peripheral interface SPI bus, to the flash storing a BIOS file, and the BMC is connected to the computer hardware system through a second SPI bus.

10. A computer boot method, wherein the method is applied to a controller, the controller comprises a security check kernel, and the security check kernel communicates with a control switch through an enable control pin of the control switch, the control switch is connected to the security check kernel through a first channel, the control switch is connected to a computer hardware system through a second channel, the control switch is connected to a BIOS file storage apparatus through a third channel, and the control switch includes an initial state and an actuated state, the initial state with the security check kernel connected to the BIOS file storage apparatus and the computer hardware system disconnected from the BIOS file storage apparatus and the actuated state with the security check kernel disconnected from the BIOs file storage apparatus and the computer hardware system connected to the BIOS file storage apparatus, and the computer boot method comprises:

obtaining, by the security check kernel, a first boot program file that is a BIOS file pre-stored in the BIOS file storage apparatus through the first channel and the third channel with the control switch in the initial state;

checking, by the security check kernel, the first boot program file;

sending, by the security check kernel, a first instruction to the control switch through the enable control pin to change the control switch from the initial state to the actuated state when the first boot program file is successfully checked; and receiving, by the control switch, the first instruction through the enable control pin, and connecting, by the control switch changing from the initial state to the actuated state, the second channel to the third channel according to the first instruction establishing a connection between the BIOS file storage apparatus and the computer hardware system when the second channel is connected to the third channel causing the computer hardware system to complete power-on and running using the first boot program file.

11. The method according to claim 10, wherein the controller further comprises a memory, the security check kernel is connected to the memory, and the memory prestores a boot program source file; and the checking, by the security check kernel, the first boot program file comprises:

performing, by the security check kernel, check calculation using a key and the boot program source file in the memory, to obtain a first check result;

performing, by the security check kernel, check calculation using the key and the first boot program file, to obtain a second check result; and determining, by the security check kernel based on the first check result and the second check result, whether the first boot program file is successfully checked.

12. The method according to claim 10, wherein the controller further comprises a memory, the security check kernel is connected to the memory, and the memory prestores a boot program source file; and the method further comprises:

writing, by the security check kernel, the boot program source file to the BIOS file storage apparatus when the first boot program file fails to be checked;

checking, by the security check kernel, the boot program source file written to the BIOS file storage apparatus;

sending, by the security check kernel, the first instruction to the control switch through the enable control pin to change the control switch from the initial state to the actuated state when the boot program source file written to the BIOS file storage apparatus is successfully checked; and receiving, by the control switch, the first instruction through the enable control pin, and connecting, by changing the control switch from the initial state to the actuated state, the second channel to the third channel according to the first instruction connecting the BIOS file storage apparatus and the computer hardware system when the second channel is connected to the third channel causing the computer hardware system to complete power-on and running using the boot program source file written to the BIOS file storage apparatus.

13. A controller, comprising:

a security check kernel communicatively coupled to a control switch;

connected to a computer hardware system and connected to a BIOS file storage apparatus, the control switch comprising an initial state and an actuated state, wherein in the initial state the security check kernel is connected to the BIOS file storage apparatus and the computer hardware system is disconnected from the BIOS file storage apparatus and in the actuated state the security check kernel is disconnected from the BIOS file storage apparatus and the computer hardware system is connected to the BIOS file storage apparatus;

a memory configured to store instructions for the security check kernel; and a processor, communicatively coupled with the memory, configured to execute the instructions in the memory, to perform operations that comprise:

obtaining a first boot program file that is a BIOS filed pre-stored in the BIOS file storage apparatus when the controller is powered on and runs with the control switch in the initial state, checking the first boot program file, and establishing, by changing the control switch from the initial state to the actuated state, a connection between the BIOS file storage apparatus and the computer hardware system when the first boot program file is successfully checked the computer hardware system completes power-on and running using the first boot program file when the connection between the BIOS file storage apparatus and the computer hardware system is successfully established.

14. A controller, comprising:

a control switch connected to a security check kernel through a first channel, the control switch connected to a computer hardware system through a second channel, and the control switch connected to a BIOS file storage apparatus through a third channel, wherein the control switch has an initial state and an actuated state and comprises an enable control pin through which the control switch and the security check kernel communicate to change the control switch from the initial state and the actuated state, the initial state with the security check kernel connected to the BIOS file storage apparatus and the computer hardware system disconnected from the BIOS file storage apparatus and the actuated state with the security check kernel disconnected from the BIOS file storage apparatus and the computer hardware system connected to the BIOS file storage apparatus;

the security check kernel is configured to:

obtain a first boot program file in the BIOS file storage apparatus through the first channel and the third channel with the control switch in the initial state, wherein the first boot program file is a BIOS file pre-stored in the BIOS file storage apparatus, check the first boot program file, and send a first instruction to the control switch through the enable control pin to change the control switch from the initial state to the actuated state when the first boot program file is successfully checked; and the control switch is configured to:

receive the first instruction through the enable control pin, connect, by changing the control switch from the initial state to the actuated state, the second channel to the third channel according to the first instruction, and establishing, via the control switch, a connection between the BIOS file storage apparatus and the computer hardware system when the second channel is connected to the third channel causing the computer hardware system to complete power-on and running using the first boot program file.

15. The controller according to claim 14, wherein the controller further comprises a memory, the security check kernel is connected to the memory, and the memory prestores a boot program source file; and the security check kernel is further configured to: perform check calculation using a key and the boot program source file in the memory, to obtain a first check result; perform check calculation using the key and the first boot program file, to obtain a second check result; and determine, based on the first check result and the second check result, whether the first boot program file is successfully checked.

16. The controller according to claim 14, wherein the controller further comprises a memory, the security check kernel is connected to the memory, and the memory prestores a boot program source file;

the security check kernel is further configured to:

write the boot program source file to the BIOS file storage apparatus when the first boot program file fails to be checked, check the boot program source file written to the BIOS file storage apparatus, and send the first instruction to the control switch through the enable control pin when the boot program source file written to the BIOS file storage apparatus is successfully checked; and the control switch is further configured to:

receive the first instruction through the enable control pin, and connect, by changing the control switch from the initial state to the actuated state, the second channel to the third channel according to the first instruction to establish, via the control switch, a connection between the BIOS file storage apparatus and the computer hardware system when the second channel is connected to the third channel causing the computer hardware system to complete power-on and running using the first boot program file.

17. The controller according to claim 16, wherein the security check kernel is further configured to: when the first boot program file fails to be checked, delete the first boot program file stored in the BIOS file storage apparatus.

18. The controller according to claim 14, wherein the BIOS file storage apparatus comprises a primary BIOS file storage and a secondary BIOS file storage, the control switch is connected to the primary BIOS file storage through a first subchannel, the control switch is connected to the secondary BIOS file storage through a second subchannel, and both the primary BIOS file storage and the secondary BIOS file storage pre-store the first boot program file;

the security check kernel is further configured to: obtain the first boot program file in the primary BIOS file storage through the first channel and the first subchannel with the control switch in the initial state; and check the first boot program file in the primary BIOS file storage; and the control switch is further configured to connect, by changing from the initial state to the actuated state, the second channel to the first subchannel according to the first instruction to establish, via the control switch, a connection between the primary BIOS file storage and the computer hardware system when the second channel is connected to the first subchannel.

19. The controller according to claim 18, further comprising:

the security check kernel further configured to:

obtain the first boot program file in the secondary BIOS file storage through the first channel and the second subchannel with the control switch in the initial state when the first boot program file in the primary BIOS file storage fails to be checked;

check the first boot program file in the secondary BIOS file storage; and send a second instruction to the control switch through the enable control pin to change the control switch from the initial state to the actuated state when the first boot program file in the secondary BIOS file storage is successfully checked; and the control switch further configured to:

receive the second instruction through the enable control pin, and connect, by changing the control switch from the initial state to the actuated state, the second channel to the second subchannel according to the second instruction to establish, the control switch, a connection between the secondary BIOS file storage and the computer hardware system when the second channel is connected to the second subchannel causing the computer hardware system to complete power-on and running using the first boot program file in the secondary BIOS file storage.

20. The controller according to claim 14, wherein the controller is a baseboard management controller (BMC), and the BIOS file storage apparatus is a flash storage storing a BIOS file; and the first channel is a first serial peripheral interface (SPI) bus, the second channel is a second SPI bus, and the third channel is a third SPI bus.

* * * * *